(12) United States Patent
Kocher et al.

(10) Patent No.: US 8,386,800 B2
(45) Date of Patent: Feb. 26, 2013

(54) VERIFIABLE, LEAK-RESISTANT ENCRYPTION AND DECRYPTION

(75) Inventors: Paul C. Kocher, San Francisco, CA (US); Pankaj Rohatgi, Los Altos, CA (US); Joshua M. Jaffe, San Francisco, CA (US)

(73) Assignee: Cryptography Research, Inc., San Francisco, CA (US)

( * ) Notice: Subject to any disclaimer, the term of this patent is extended or adjusted under 35 U.S.C. 154(b) by 136 days.

(21) Appl. No.: 12/958,570

(22) Filed: Dec. 2, 2010

(65) Prior Publication Data

US 2011/0138192 A1    Jun. 9, 2011

Related U.S. Application Data

(60) Provisional application No. 61/266,948, filed on Dec. 4, 2009.

(51) Int. Cl.
*H04L 9/32* (2006.01)
*H04L 9/00* (2006.01)

(52) U.S. Cl. ............................ 713/189; 380/44; 380/277

(58) Field of Classification Search .................. 380/277, 380/44; 713/181, 189, 192–194; 726/26–27
See application file for complete search history.

(56) References Cited

U.S. PATENT DOCUMENTS

| | | | | |
|---|---|---|---|---|
| 6,009,177 | A | 12/1999 | Sudia | 380/25 |
| 6,539,092 | B1 | 3/2003 | Kocher | 380/252 |
| 6,996,724 | B2 * | 2/2006 | Murakami et al. | 713/193 |
| 7,028,191 | B2 * | 4/2006 | Michener et al. | 713/182 |
| 7,657,035 | B2 * | 2/2010 | Yato et al. | 380/277 |
| 2008/0263363 | A1 | 10/2008 | Jueneman et al. | 713/184 |
| 2009/0070583 | A1 | 3/2009 | von Mueller et al. | 713/168 |

OTHER PUBLICATIONS

Faust, et al., "Leakage-Resilient Signatures," In Daniele Micciancio, editor, TCC, vol. 5978 of Lecture Notes in Computer Science, Springer, 2010, 21 pages.
Pietrzak, Krzysztof, "A Leakage-Resilient Mode of Operation," In Antoine Joux, editor, EUROCRYPT, vol. 5479 of Lecture Notes in Computer Science, Springer, 2009, pp. 462-482.
Dziembowski, et al., "Leakage-Resilient Cryptography in the Standard Model", in FOCS, IEEE Computer Society, 2008, 21 pages.
Standaert, et al., "Leakage Resilient Cryptography in Practice," Cryptology ePrint Archive, Report 2009/341, 2009, found at http://eprint.iacr.org/2009/341.pdf. pp. 1-37.

(Continued)

*Primary Examiner* — Hosuk Song
(74) *Attorney, Agent, or Firm* — Finnegan, Henderson, Farabow, Garrett & Dunner, L.L.P.

(57) ABSTRACT

This patent describes techniques usable by devices to encrypt and decrypt sensitive data to in a manner that provides security from external monitoring attacks. The encrypting device has access to a base secret cryptographic value (key) that is also known to the decrypting device. The sensitive data are decomposed into segments, and each segment is encrypted with a separate encryption key derived from the base key and a message identifier to create a set of encrypted segments. The encrypting device uses the base secret cryptographic value to create validators that prove that the encrypted segments for this message identifier were created by a device with access to the base key. The decrypting device, upon receiving an encrypted segments and validator(s), uses the validator to verify the message identifier and that the encrypted segment are unmodified, then uses a cryptographic key derived from the base key and message identifier to decrypt the segments. Derived keys and validators are produced using methods designed to preserve security even if cipher and hashing operations leak information. Embodiments for systems including SoCs, firmware loading, FPGAs and network communications are described.

68 Claims, 14 Drawing Sheets

Verifiable leak-resistant encryption using ciphertext hash chaining

OTHER PUBLICATIONS

Lorentz Center. Workshop on Provable Security against Physical Attacks, Feb. 15-19, 2010, found at http://www.lorentzcenter.nl/lc/web/2010/383/presentations/index.php3?wsid=383&type=presentations.—1 page.

Kocher, et al., "Differential Power Analysis" Advances in Cryptology—Crypto 99 Proceedings, Lecture Notes in Computer Science, vol. 1666, Springer-Verlag, 1999, pp. 388-397.

McEvoy, Robert P., et al., "All-or-NothingTransforms as a Countermeasure to Differential Side-Channel Analysis," Cryptology ePrint Archive, Report 2009/185, http://eprint.iacr.org/2009/185,18 pages.

Petit, Christophe, et al., "A Block Cipher based PRNG Secure Against Side-Channel Key Recovery," Proceedings of ASIACCS 2008, Tokyo, Japan, Mar. 2008, pp. 1-22.

Pietrzak, K., "Provable Security for Pysical Cryptography," invited talk, paper, in the Proceedings of WEWORC 2009, Graz, Austria, Jul. 2009, 17 pages.

Pietrzak, K., "Provable Security for Physical Cryptography," invited talk, slides, in the Proceedings of WEWORC 2009, Graz, Austria, Jul. 2009, 126 pages.

Standaert, Francois-Xavier, "How Leaky is an Extractor?," workshop on Provable Security against Sid-Channel Attacks, Leiden, The Netherlands, Feb. 2010, pp. 1-11.

International Preliminary Report on Patentability in International Application No. PCT/US2010/058768, dated Jun. 14, 2012, 12 pages.

* cited by examiner

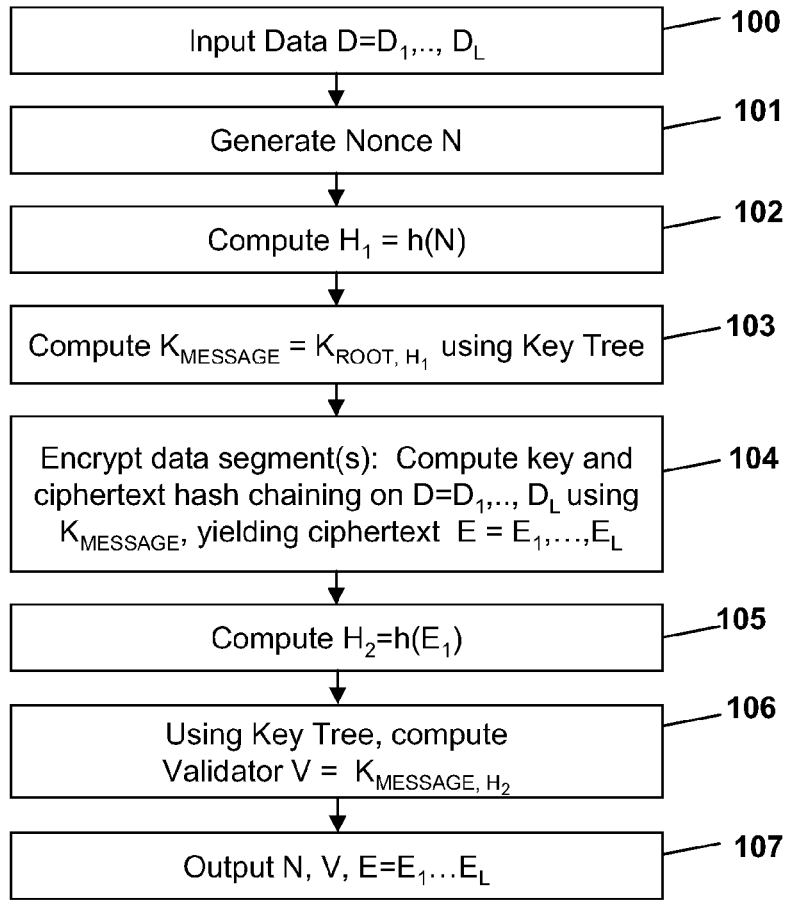
Figure 1: Verifiable leak-resistant encryption using ciphertext hash chaining

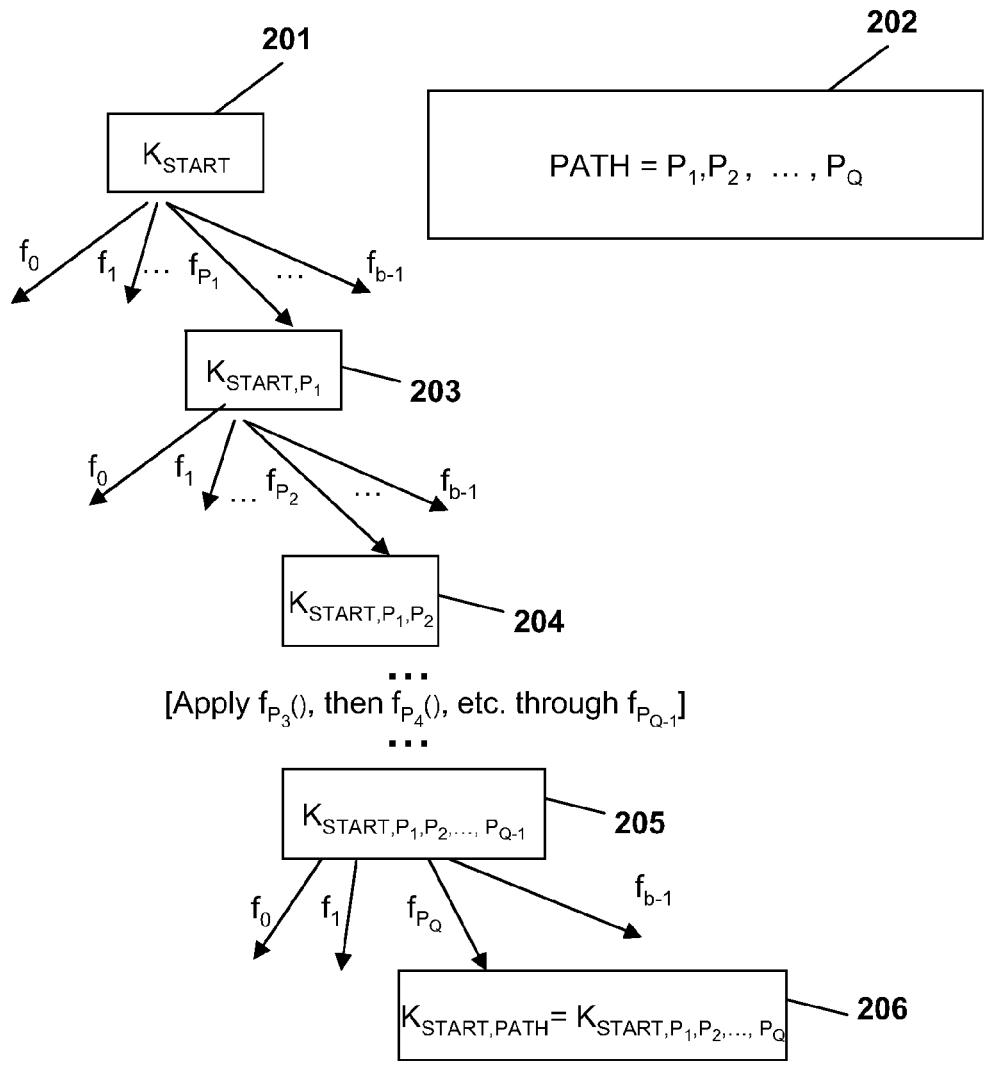
Figure 2: Leak-resistant key-tree based key derivation process from the key $K_{START}$

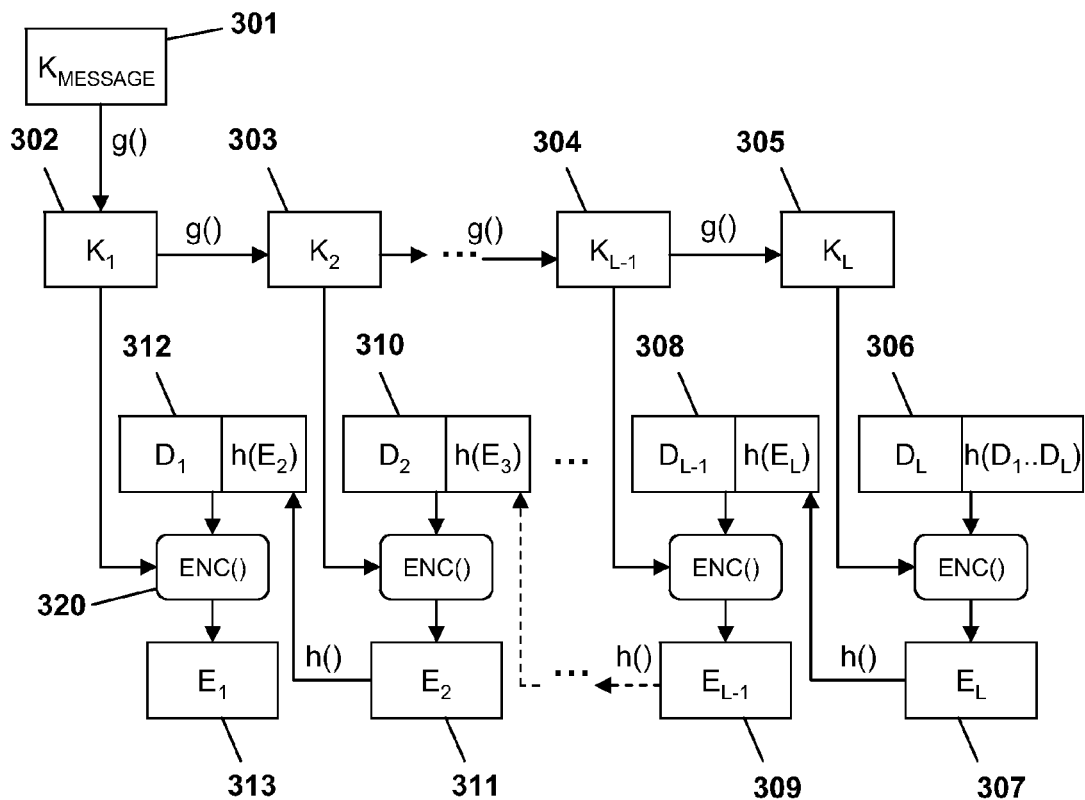
Figure 3: Leak-resistant, key and ciphertext hash chaining process for encryption

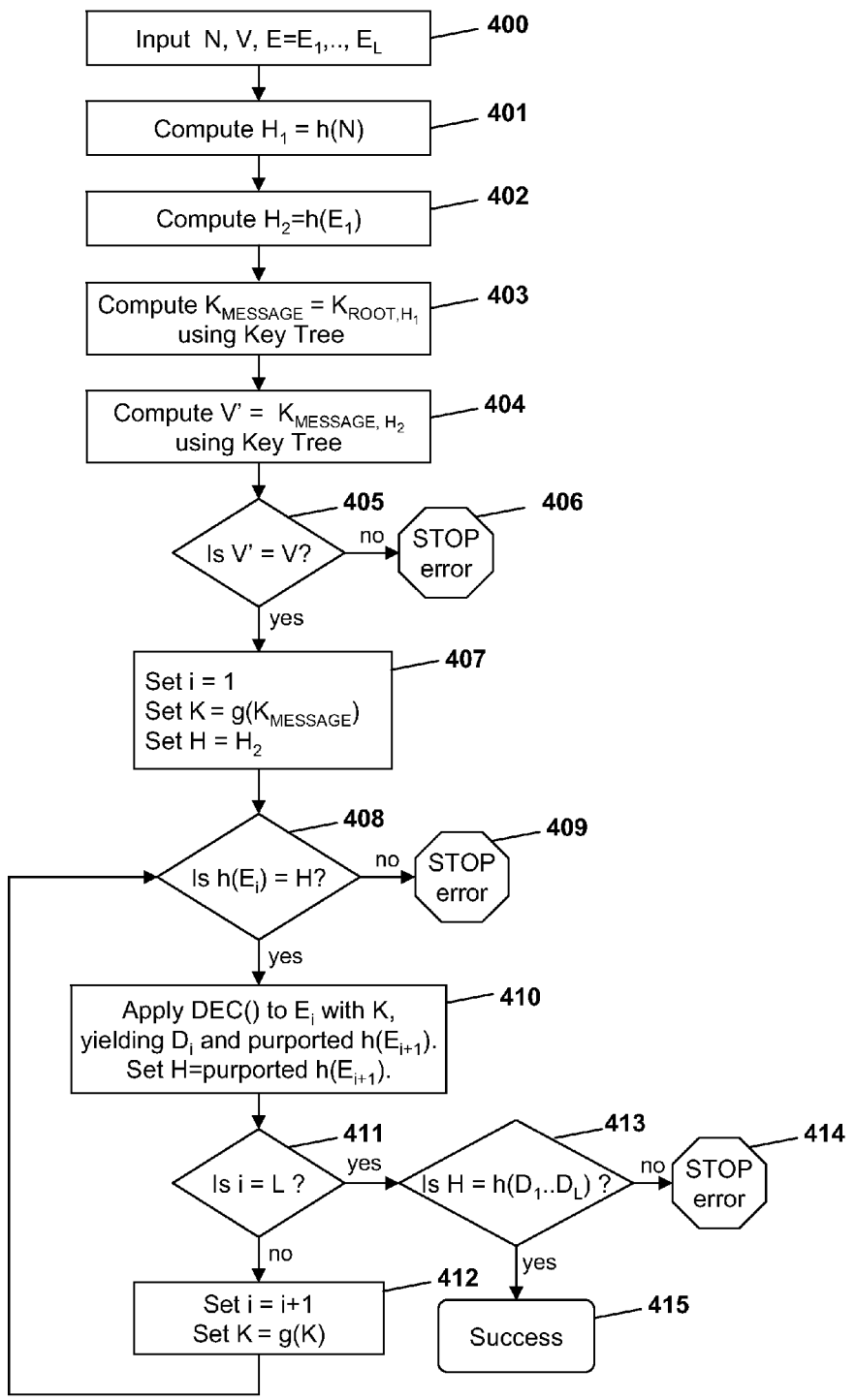
Figure 4: Verifiable leak resistant decryption using ciphertext hash chaining

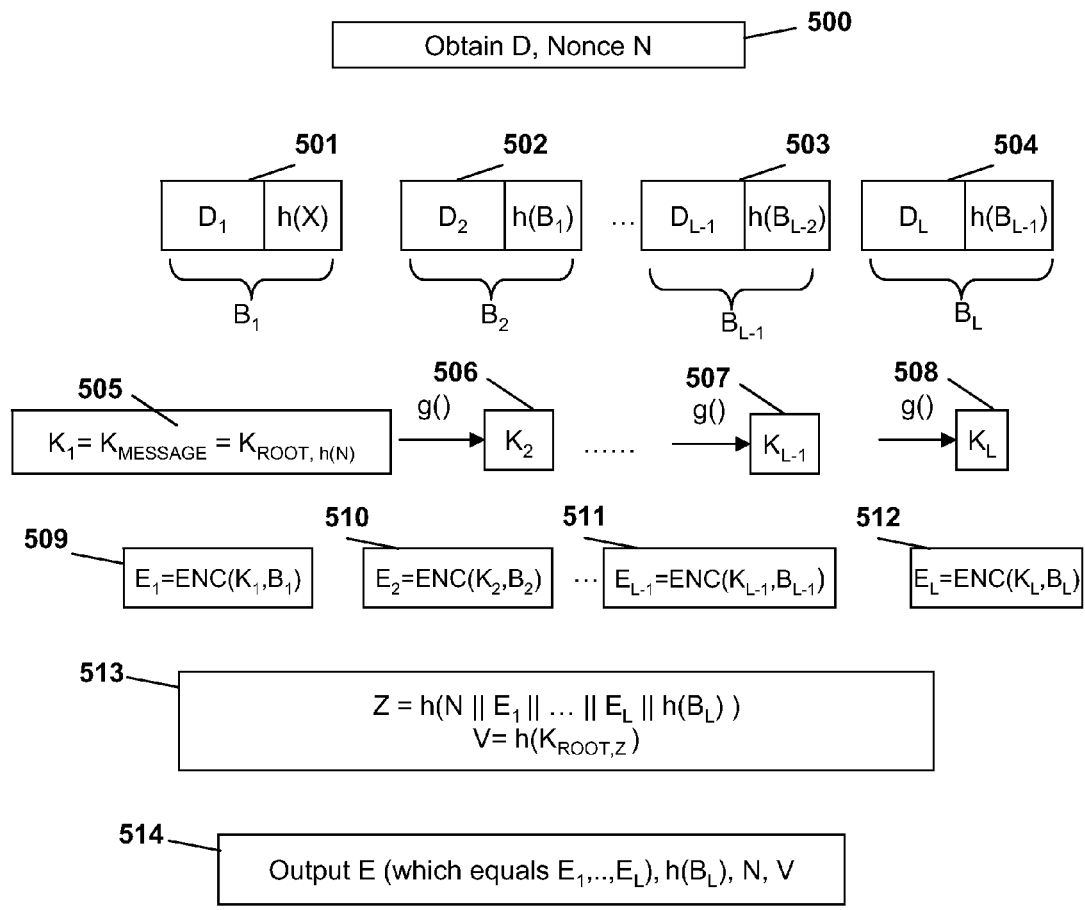
Figure 5: Verifiable leak-resistant encryption using plaintext hash chaining

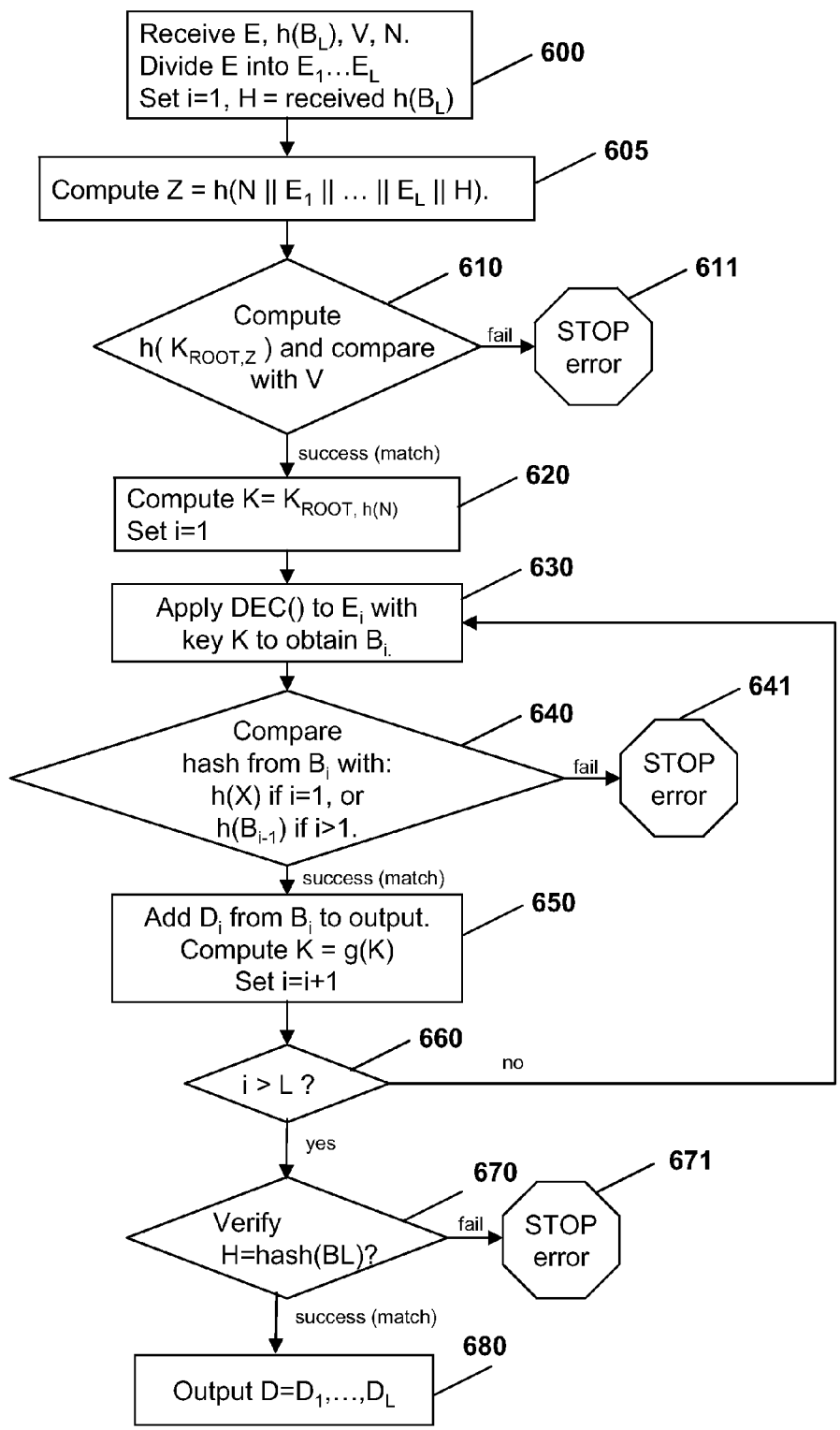
Figure 6: Verifiable leak resistant decryption using plaintext hash chaining

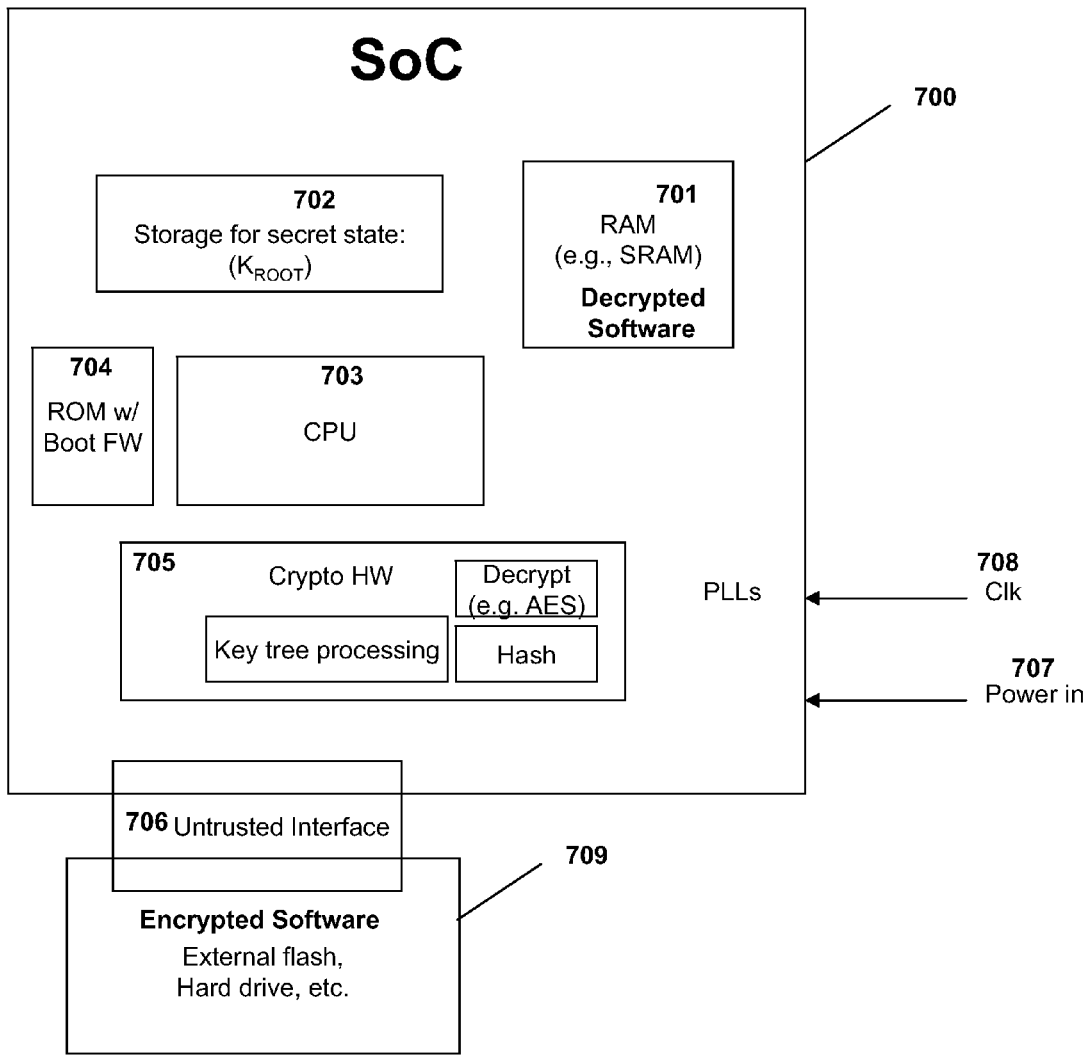
Figure 7: Firmware loading

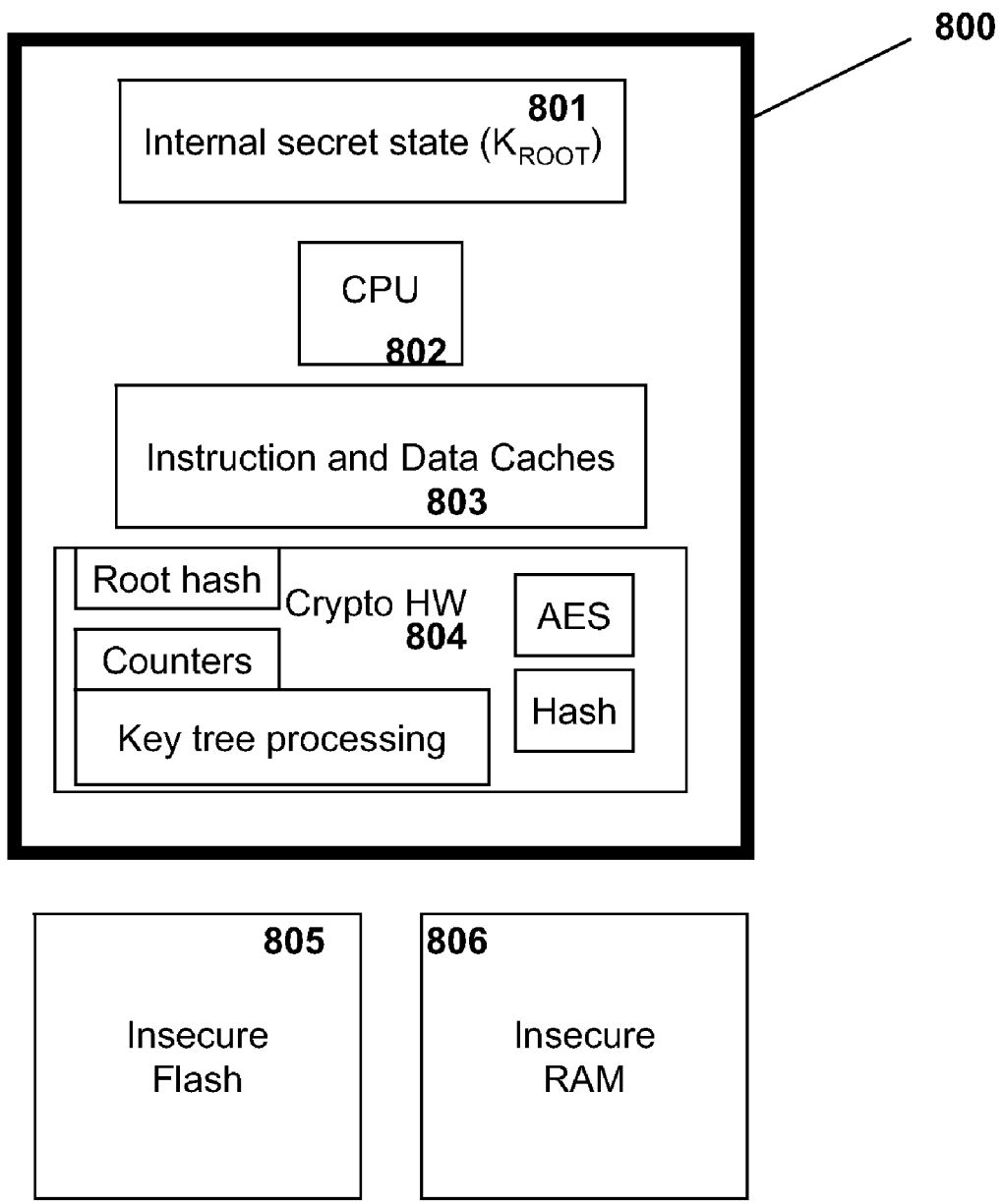
Figure 8: Secure CPU

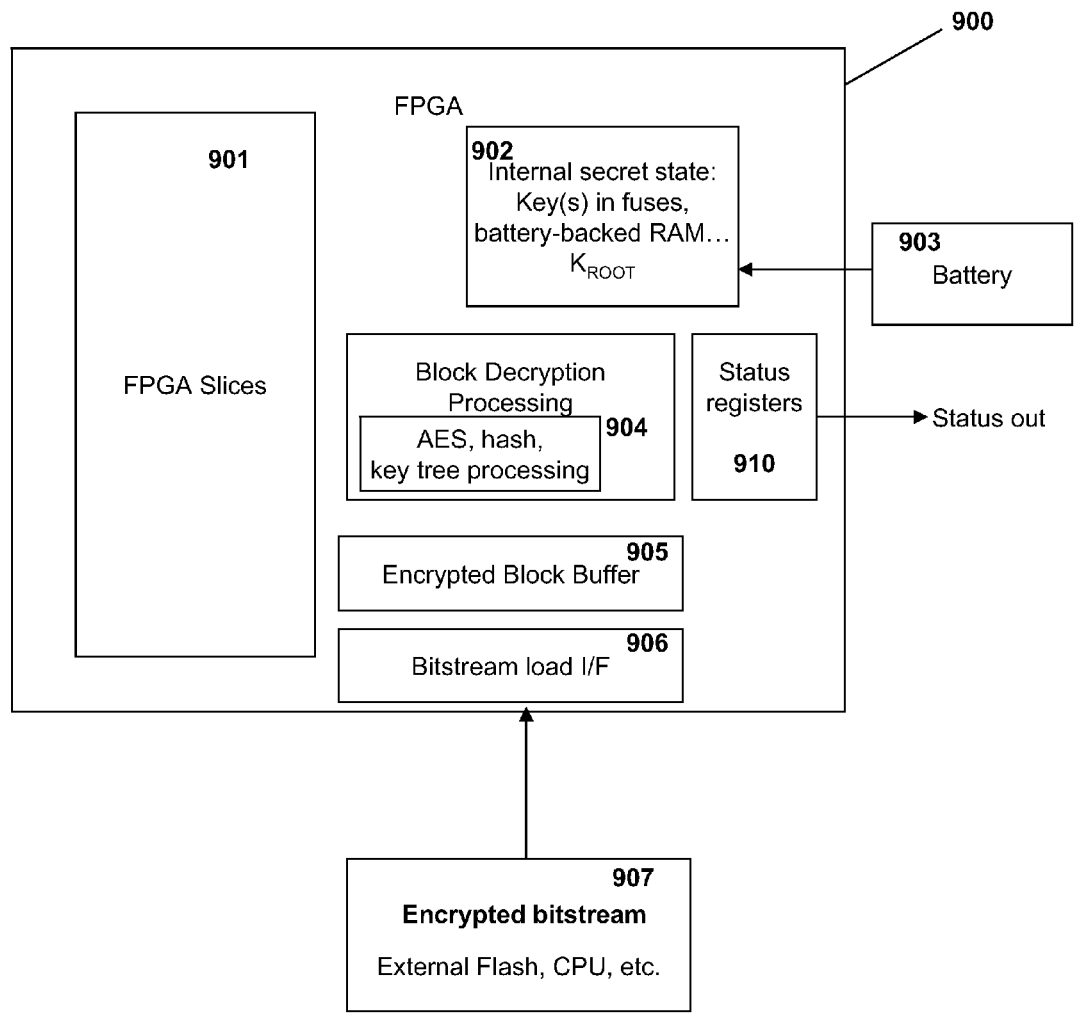
Figure 9: FPGA bitstream loading

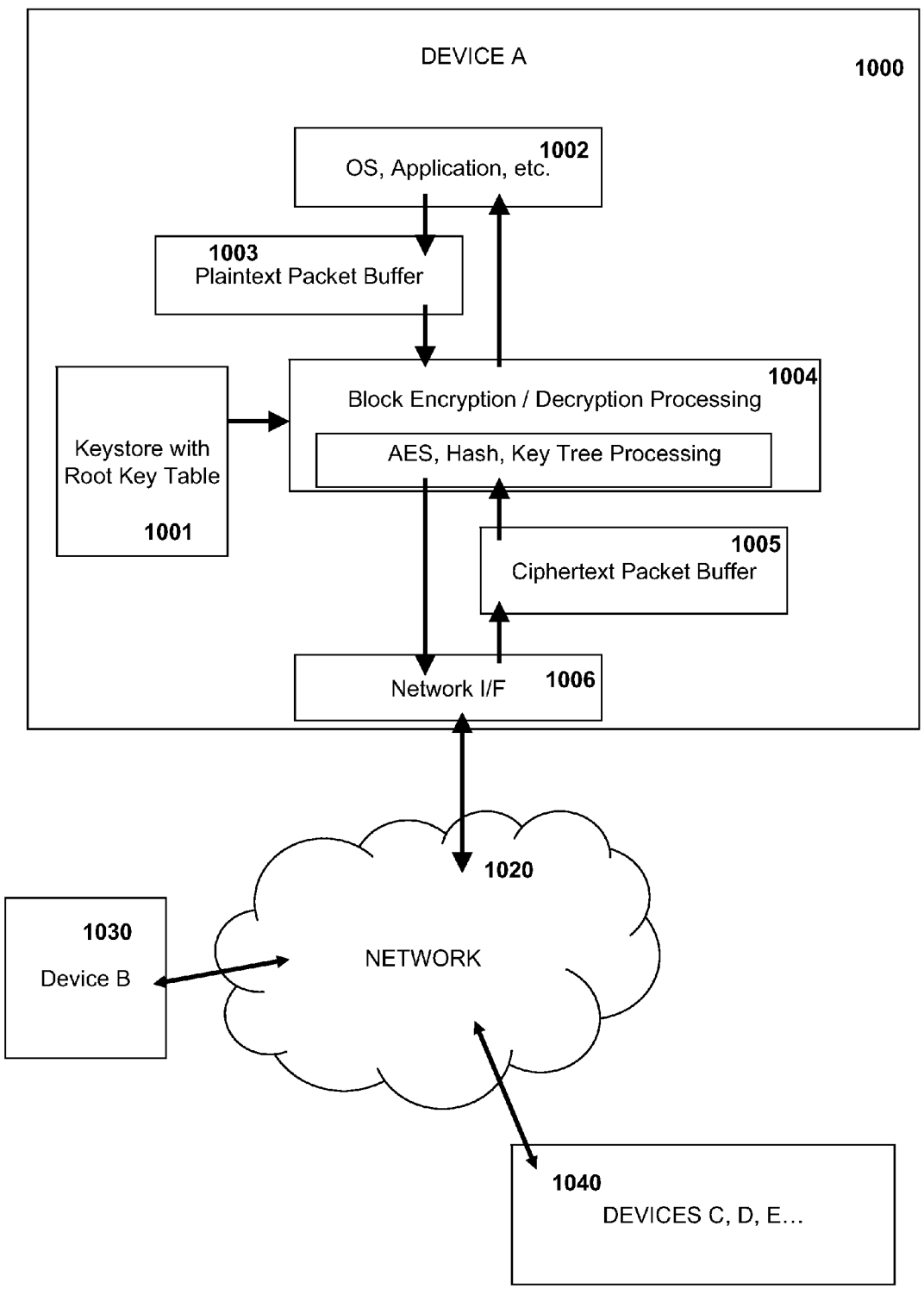
Figure 10: Network communication devices

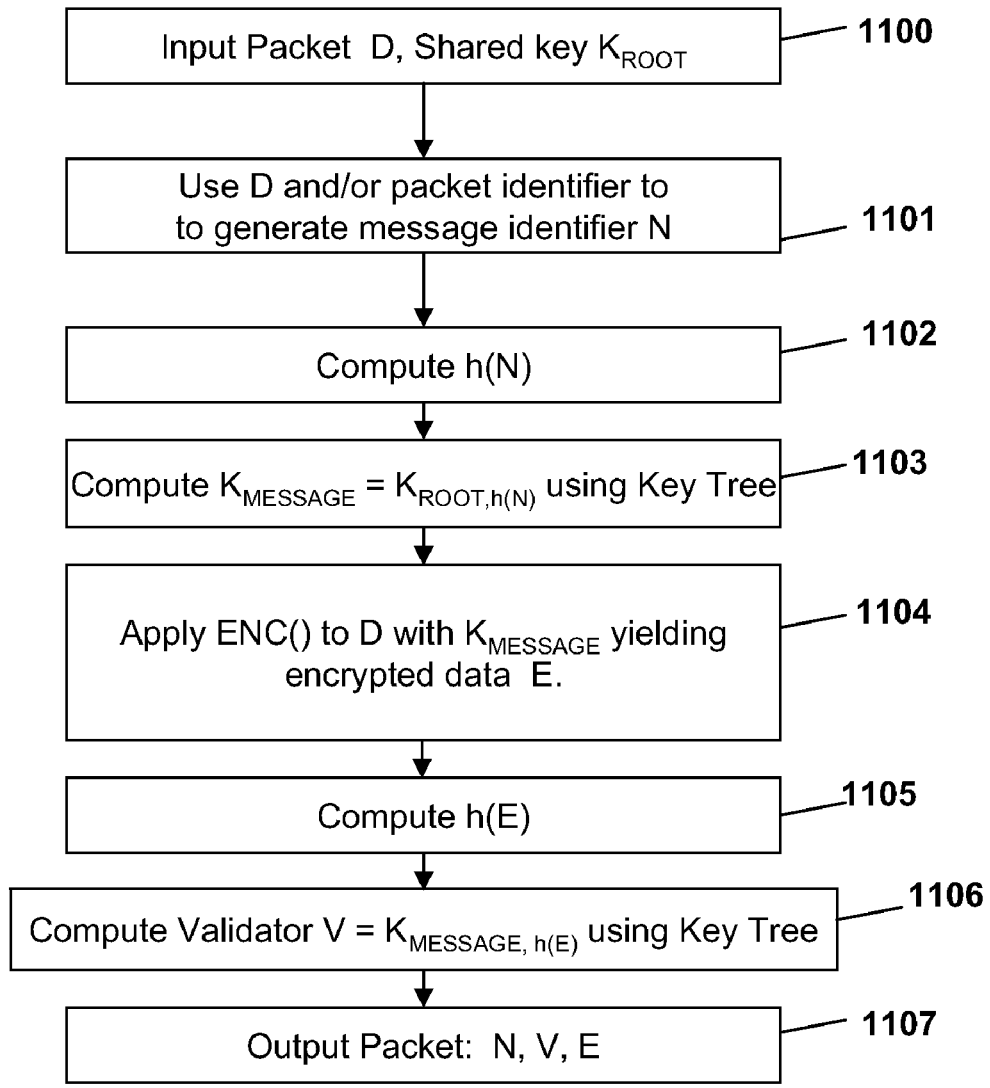
Figure 11: Verifiable packet level Leak-Resistant Encryption

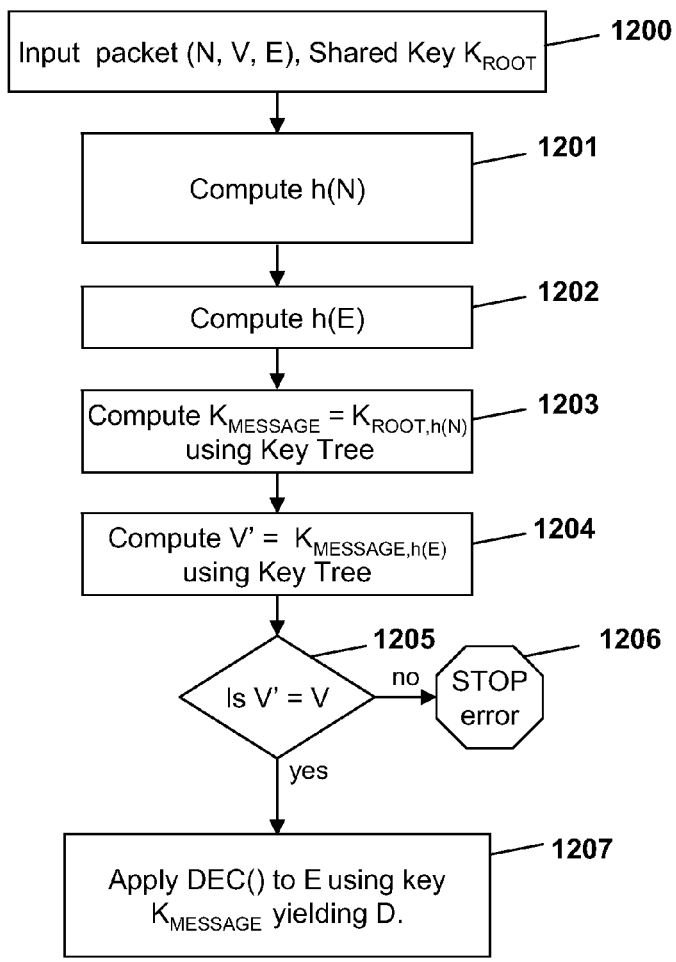
Figure 12: Verifiable packet level leak resistant decryption

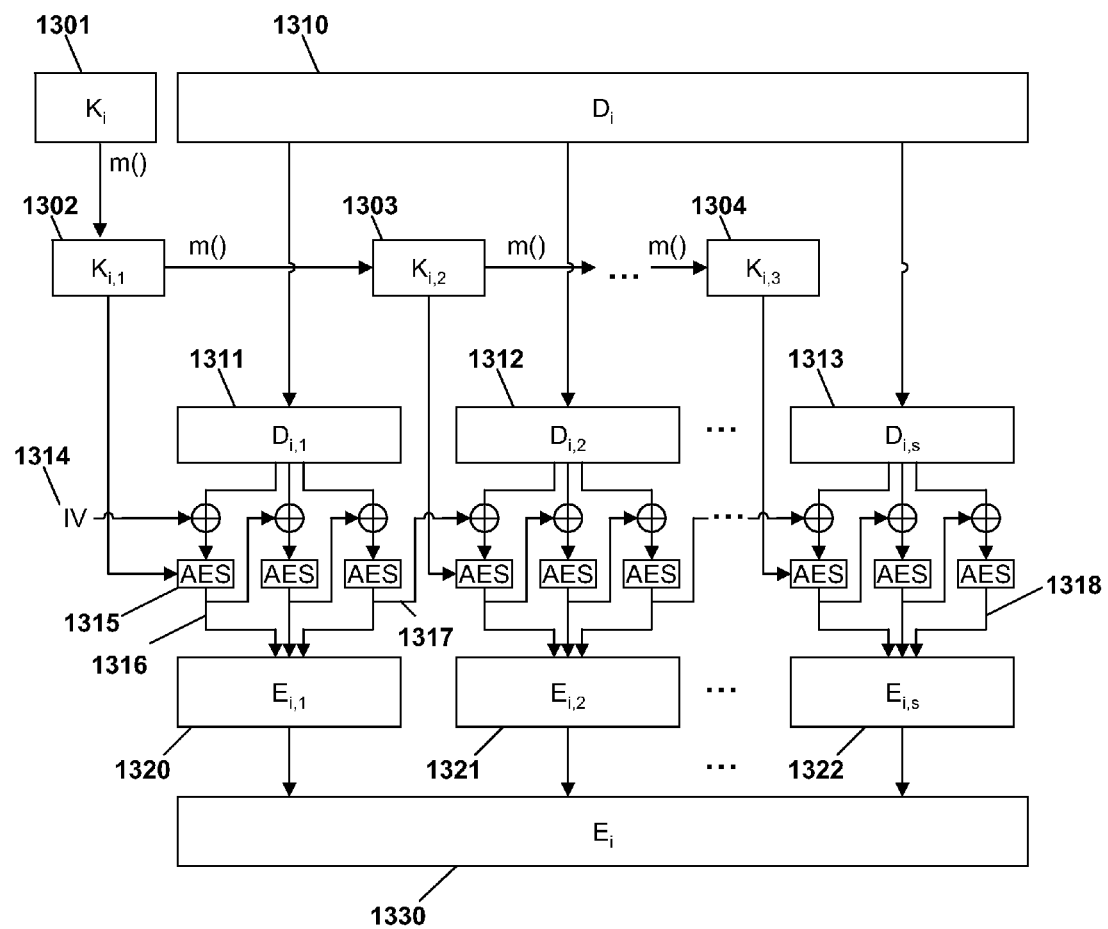
Figure 13: Exemplary ENC() CBC method with intra-segment key changes

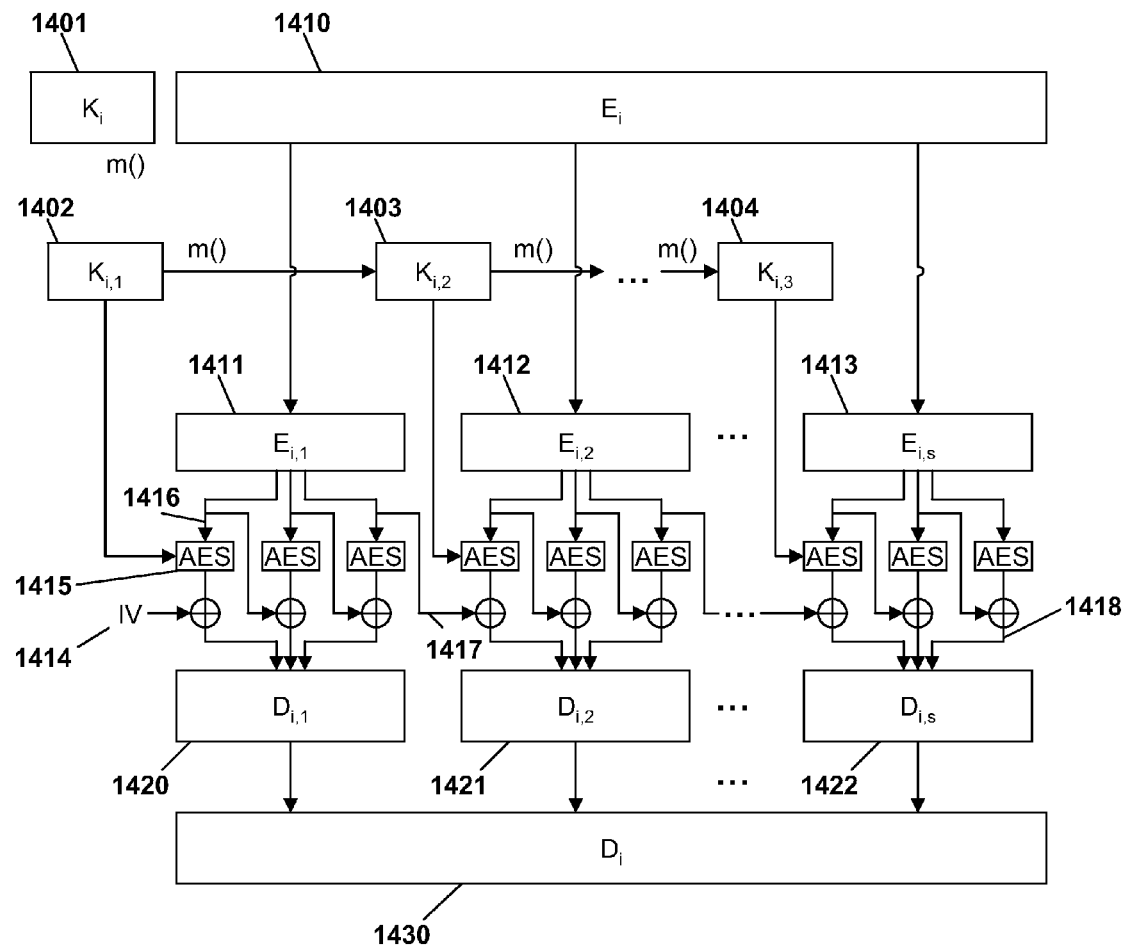
Figure 14: Exemplary DEC() CBC method with intra-segment key changes

VERIFIABLE, LEAK-RESISTANT ENCRYPTION AND DECRYPTION

CROSS-REFERENCE TO RELATED APPLICATIONS

This application claims priority to U.S. Provisional Patent Application Ser. No. 61/266,948, filed Dec. 4, 2009, which is incorporated herein in its entirety by this reference thereto.

FIELD

This patent relates to techniques for processing encrypted data inputs, and more specifically, to protecting such systems and data against external monitoring attacks.

BACKGROUND

Systems that operate on sensitive data need to protect against the unauthorized access to, or disclosure or alteration of, such data by attackers. Attackers who gain access to cryptographic keys and other secrets could steal or tamper with the sensitive data, leading to severe consequences such as subversion of critical operations of the system through the introduction of unauthorized commands and the exposure of confidential or proprietary information. One compromised element may also be used to mount further attacks, endangering other elements of a system. More specifically, previous research has shown that an attacker can monitor a device's external characteristics such as operation timing, power consumption and/or electromagnetic radiation and use this additional information to extract the secret keys being used within the device. For example, as described by Kocher et al (see P. Kocher, J. Jaffe, B. Jun, "Differential Power Analysis," Advances in Cryptology—Crypto 99 Proceedings, Lecture Notes In Computer Science Vol. 1666, Springer-Verlag, 1999), it is well known in the art that external monitoring of a device performing a sequence of cryptographic operations using the same set of keys with different data can result in the leakage of the key.

Because external monitoring attacks are typically passive and non-invasive, traditional tamper resistance defenses which are based on thwarting physical access or detecting improper usage are insufficient or impractical to provide protection against such attacks. For example, methods for managing secret keys using physically secure, well-shielded rooms are known in the background art. However, in many applications, requiring cryptographic systems to remain in physically isolated facilities is not feasible, given the environments in which they are expected to operate. In addition, such facilities are expensive to build and operate, and may still be imperfect in their ability to prevent small amounts of information from leaking to adversaries.

Of course, other methods are known in the background art that can mitigate the problem of information leakage from monitoring attacks without necessarily relying on physical shielding. These include methods for reducing the amount (or rate) of information leaking from transactions, modifying cryptographic algorithm implementations to randomize computational intermediates, and/or introducing noise in power consumption and operation timing.

For example, U.S. Pat. No. 6,539,092, entitled "Leak-Resistant Cryptographic Indexed Key Update," provides methods for converting a shared master key and an index value (e.g., a counter) into a transaction key, where the derivation is protected against external monitoring attacks. Those methods work well in applications where the device(s) being protected against external monitoring attacks can contribute to the derivation of the transaction key. For example, the '092 patent describes how a smartcard can maintain an index counter which increments with each transaction, then use the index counter in the key derivation.

There are applications, however, where the participant(s) in a protocol should be protected against external monitoring attacks, but lack the ability to store sequence counters and updated keys, as described in the '092 patent. For example, consider the case where a device needs to regularly process the same input data, such as a device which contains a fixed and unchanging embedded key that is repeatedly used to decrypt ciphertexts in arbitrary order. Firmware encryption is an example of such an application; a microprocessor may be manufactured having an embedded key in fuses, and on every reboot the microprocessor needs to re-decrypt its firmware image loaded from an untrusted external flash. The firmware image may occasionally be updated, but the same ciphertext may also be decrypted repeatedly. Thus, both the application requirements and the physical manufacturing limitations (such as the inability to modify stored keys due to the use of one-time-programmable fuses to hold keys) can make it impractical for the device to limit the number of times the decryption key will be used. The firmware publisher could use the methods described in the '092 patent with a new index value each time a new encrypted firmware image is released, but the decrypting device cannot use a different index value on each reboot, since changing the index value to a value other than the one used by the encrypting device would result in an incorrect decryption. Thus, an attacker can potentially supply the decryption device with tampered data sets, then attempt to recover the secret key by monitoring external characteristics while the device processes (e.g., decrypts, etc.) these ciphertexts. Statistical side channel attacks, such as differential power analysis (DPA), can deduce a secret key from a set of measurements collected when a device uses the same key repeatedly to operate on different input values (such as the different firmware ciphertexts or tampered versions of the same firmware ciphertexts in the foregoing examples). Measurements from a single long message (e.g., comprising many block cipher inputs) or a collection of legitimate messages (such as multiple firmware versions) may also provide sufficient data for a side channel attack, even if ciphertext messages are not tampered.

Of course, in some situations where a device uses the same key for every transaction, the device could theoretically implement a lock-out (e.g., by self-destructing if a transaction or failure threshold is exceeded) to limit the number of transactions an adversary can observe. Lock-out mechanisms, however, introduce numerous practical problems, however, such as reliability concerns and the difficulties associated with storing a failure counter (e.g., many semiconductor manufacturing processes lack secure on-chip nonvolatile storage, and off-chip storage is difficult to secure).

In light of all the foregoing, a method that provides a verifiably secure way for devices to communicate and exchange data, with protection against external monitoring attacks and the ability for devices to reject non-genuine data, would be advantageous.

SUMMARY

This patent describes ways to secure devices which utilize secret cryptographic keys against external monitoring attacks, as well as to provide improved security against conventional cryptanalysis and other attacks (such as DPA and other forms of external monitoring attacks) which gather information correlated to the device's internal operations. Various exemplary embodiments for encrypting sensitive data are disclosed in the specification.

While these various embodiments may vary considerably in their details, they are all encompassed within the following general technique, as may be readily verified with respect to the various embodiments described in the specification: With respect to encryption, each set of data to be encrypted is associated with a message identifier (such as a transaction/ message counter, a hash of the plaintext, a random value, or another unique or semi-unique value). The encryption device derives a message key using the message identifier and an initial secret internal state that is shared with the decryption device(s). This derivation is performed in an iterative manner through a succession of one or more intermediate keys, starting from at least a portion of the shared secret internal state and leading up to the message key, where, in each iteration, the next key depends on at least one prior key and at least a portion of the message identifier. The plaintext may be decomposed into one or more segments. Each plaintext segment is encrypted with one or more secret keys that can include the message key, or keys further derived from the message key, to create the corresponding encrypted segment. Typically, a different key (or a different set of keys) is used for each segment.

The encrypting device then uses a secret key shared with the decrypting device (such as the message key, the secret internal secret, a different key, keys derived from the foregoing, etc.) to compute at least one validator. Derivation of the validator may be performed using an iterative process similar to that used to produce the message key, whereby a sequence of transformations are applied to the secret key to produce successive values (for example, where the generation of each intermediate includes hashing its parent value).

The encrypting device outputs the one or more encrypted segments and one or more validators. Additional information may also be output as needed to enable the recipient to determine the message identifier.

During the corresponding decryption process, a decrypting device receives the one or more encrypted segments, one or more validator(s), and the message identifier corresponding to the encrypted segment(s). It then uses one or more validators to verify that at least the first encrypted segment to be decrypted has not been modified. Verification of the validator may include computing a sequence of successive intermediate values, starting with a secret shared with the encrypting device and where each intermediate is the hash of its parent (and the specific hash operation depends on a portion of the hash of said encrypted segment(s)). Typically, the decryption process for an encrypted segment is only permitted to proceed if it is verified that the segment is not modified. If verification is successful, the decrypting device computes the message key (if not already derived), using the secret internal state that it shares with the encryption devices, by following the same iterative key derivation process followed by the encrypting device (i.e., starting from at least a portion of the shared secret internal state, leading to the final message key, through a sequence of intermediate keys, where at each step the next key depends on at least a portion of the message identifier and at least one prior key). Each encrypted segment (if determined to be unmodified) is decrypted with the one or more corresponding secret keys derived from the message key to recover the corresponding plaintext segment.

BRIEF DESCRIPTION OF THE FIGURES

FIG. 1 shows an exemplary embodiment of the overall process for verifiable, leak-resistant encryption using key and ciphertext hash chaining.

FIG. 2 shows an exemplary embodiment of a leak resistant, key-tree-based key derivation process starting from a shared cryptographic secret, $K_{START}$, and continuing through a path $P_1 \ldots P_Q$. The key derivation process of FIG. 2 is usable in connection with the first exemplary encryption process of FIGS. 1 & 3 and the first exemplary decryption process of FIG. 4. It is also usable in connection with the other exemplary encryption processes of FIGS. 5, 11 & 13, and the other exemplary decryption processes of FIGS. 6, 12 & 14.

FIG. 3 shows an exemplary embodiment of a leak-resistant key and ciphertext hash chaining process for encryption (e.g., comprising part of the overall encryption process shown in FIG. 1).

FIG. 4 shows an exemplary embodiment of a verifiable, leak-resistant decryption process using key and ciphertext hash chaining corresponding to the encryption process of FIG. 1 (and FIG. 3).

FIG. 5 shows an exemplary embodiment of a process for verifiable, leak-resistant encryption using key and plaintext hash chaining.

FIG. 6 shows an exemplary embodiment of a process for verifiable, leak-resistant decryption using key and plaintext hash chaining corresponding to the encryption process of FIG. 5.

FIG. 7 shows an environment in which verifiable, leak-resistant cryptographic operations are used for loading firmware onto a system on a chip.

FIG. 8 shows an environment in which verifiable, leak-resistant cryptographic operations are used within a secure CPU chip, where external memory such as flash and/or RAM is untrusted.

FIG. 9 shows an environment in which verifiable, leak-resistant cryptographic operations are used for loading a bitstream image on to a field programmable gate array.

FIG. 10 shows an environment in which verifiable, leak-resistant cryptographic operations are used in a packet based network communication device.

FIG. 11 shows an exemplary embodiment of a process for verifiable packet-level leak-resistant encryption that can be used with the environment described in FIG. 10, as well as in other embodiments.

FIG. 12 shows an exemplary embodiment of a process for verifiable packet-level leak-resistant decryption corresponding to the encryption process described in FIG. 11.

FIG. 13 shows an exemplary embodiment of an exemplary ENC( ) operation, using cipher block chaining (CBC) with intra-segment key changes.

FIG. 14 shows an exemplary embodiment of an exemplary DEC( ) operation, using cipher block chaining (CBC) with intra-segment key changes, corresponding to the encryption operation of FIG. 13.

DETAILED DESCRIPTION

The techniques described in this patent enable parties to communicate cryptographically-protected sensitive data with increased security against external monitoring attacks. Although exemplary embodiments are described involving two parties, typically referred to as an "encrypting device" and a "decrypting device", the term "device" is chosen for convenience and need not necessarily correspond directly to any particular role in a system design. The devices may, but are not required to, utilize different form factors or implementations. For example, the encrypting and decrypting devices could both be portable hardware devices. Alternatively, the encrypting device could be a software application running on a server operating in a facility, while the decrypting device could be a portable hardware device (or vice versa). Furthermore, although most cryptographic operations involve two parties, the techniques of this patent can, of course, be applied in environments involving only one party (such as in secure memory or storage systems in which both roles are under a single party's and/or device's control, e.g., in the exemplary environment illustrated in FIG. 8) or in environments involving more than two parties and/or devices (such as the exemplary embodiment which is illustrated in FIG. 10).

Entropy Redistribution Operations

As used herein, an "entropy redistribution operation" (or "entropy distribution operation") is an operation which mixes its input(s) such that unknown information about input bits is redistributed among the output bits. For example, suppose an x bit cryptographic key $K_0$ is processed repeatedly with an entropy redistribution operation f such that key $K_i=f(K_{i-1})$ for each i>1. Next, suppose an adversary obtains y bits of information (e.g., obtained as part of an attempted external monitoring attack) about each of n different keys $K_i$, providing more than enough information to solve for key $K_0$ (e.g., y*n>x). The use of the entropy distribution operation f can make such solution computationally infeasible. A cryptographic hash function H is an example of an operation that may be used as an entropy redistribution operation. For example, consider a strong hash function H that produces a 256-bit result. Given a random 256-bit initial key $K_0$, let $K_i=H(K_{i-1})$ for each i>1. An adversary with knowledge of (for example) the least-significant bit of each $K_0 \ldots K_{999,999}$ has 1,000,000 bits of data related to $K_0$. A hypothetical adversary with infinite computing power could find $K_0$ by testing all possible $2^{256}$ values for $K_0$ to identify a value which is consistent with the known sequence of least-significant bits. Actual adversaries have finite computational power available, however, and the entropy redistribution operation prevents there from being a computationally practical way to solve for $K_0$ (or any other $K_i$) given the information leaked through attempted external monitoring attacks.

Entropy redistribution operations may be implemented, without limitation, using cryptographic hash functions, operations constructed using block ciphers (such as AES), pseudorandom transformations, pseudorandom permutations, other cryptographic operations, or combinations thereof. As a matter of convenience, certain exemplary embodiments are described with respect to a hash, but those skilled in the art will understand that, pursuant to the foregoing, other entropy redistribution functions may also be used instead or in addition.

Multiple entropy redistribution operations can also be constructed from a base operation. By way of example, if two 256-bit entropy redistribution operations $f_0()$ and $f_i()$ are required, $f_0()$ could comprise applying the SHA-256 cryptographic hash function to the operation identifier string "f0" concatenated with the input to $f_0()$ while $f_1()$ could comprise applying SHA-256 to the operation identifier string "f1" concatenated with the input to $f_1()$. Entropy redistribution operations can be construed using the well-known AES block cipher. For example, to implement $f_0() \ldots f_{b-1}()$ each $f_i()$ can use its input as an AES-256 key to encrypt a pair of 128-bit input blocks that are unique to the choice of i within $0 \ldots b-1$, yielding 256 bits of output. A wide variety of block cipher based hash function and MAC constructions are also known in the background art and may also employed.

Shared Cryptographic Values and Operations

This section describes certain cryptographic value(s) and/or operation(s) shared by both the encryption device, and its corresponding decryption device, used to perform verifiable leak-resistant cryptographic operations as described in this patent.

The encrypting device and decrypting device are set up so that each has access to a base shared secret cryptographic state value, such as a secret key denoted as $K_{ROOT}$. This secret state may, for example, be stored in one or more of EEPROM, flash, fuses, or other storage on a tamper-resistant chip, and may be derived in whole or in part from other values or processes, or may be obtained externally. The method by which each of these devices obtained $K_{ROOT}$ could include, without limitation, each being manufactured with $K_{ROOT}$, the devices negotiating $K_{ROOT}$ directly with each other or via third parties (e.g., using protocols utilizing RSA, Diffie-Hellman, or other public key cryptographic techniques, or symmetric techniques), by receiving of $K_{ROOT}$ via a physical keying interface, randomly generating $K_{ROOT}$ (e.g., if the encrypting and decrypting device are the same), etc.

In addition, the encrypting device and decrypting device also are both able to compute a set of non-linear cryptographic entropy redistribution operations $f_0()$, $f_1()$, ..., $f_{b-1}()$, where b>1 is a positive integer. These b entropy redistribution functions can be configured in a tree structure. For example, a simple b-ary tree structure of height Q (i.e., having Q+1 levels, from 0 through Q) can be created by using b distinct entropy distribution functions, $f_0() \ldots f_{b-1}()$, to represent the b possible branches of this b-ary tree at each node of the tree, each node representing a possible derived key. In such a tree, starting from a root cryptographic key $K_{START}$ (which is at level 0), b possible derived keys can be computed at level 1: $f_0(K_{START})$ for the leftmost branch; $f_1(K_{START})$ for the next branch; and continuing until $f_{b-1}(K_{START})$ for the rightmost branch. At level 2, $b^2$ possible keys can be derived, since each of $f_0() \ldots f_{b-1}()$ could be applied to each of the b possible level 1 keys. Of course, computing a specific level 2 node only requires two, not $b^2$, computations (i.e., the nodes not on the path are not computed). The tree continues for successive levels 1 through Q, where each possible key (i.e., a different node) of a prior level can be processed by applying $f_0() \ldots f_{b-1}()$ in turn to derive b additional possible derived keys. The entire key tree has Q+1 levels, starting with a single node at level 0, continuing with $b^i$ nodes at level i, and ending with $b^Q$ nodes at level Q. Thus, there are $b^Q$ possible paths from the root node at level 0 to the $b^Q$ final nodes at level Q. Each such possible path, corresponding to a unique the sequence of functions applied at the different levels, can be represented as a sequence of Q integers, each integer being selected from $(0 \ldots b-1)$. For example, in an exemplary embodiment, b=2. Thus, two entropy redistribution operations, $f_0()$ and $f_1()$ are used (and may be constructed from a base operation, e.g., as described above). If Q=128 (i.e., the height is 128), $2^{128}$ paths are possible and 128 entropy redistribution function computations are required to derive the level Q key from the level 0 node (i.e., the starting key).

As a variation, embodiments can involve more variety in the choice of b, such as varying the value of b among levels, and/or varying b based on the route taken to a particular level. Likewise, the entropy redistribution operations can also be varied, such as by making the entropy redistribution operations $f_i()$ differ at different levels or making these operations depend on the sequence taken to a particular level.

The encrypting and decrypting devices are also able to perform a cryptographic, non-linear key chaining operation $g()$, which may be (but is not necessarily) distinct from the functions $f_i()$ For example, in one embodiment, $g()$ consists of a cryptographic hash operation. Variant embodiments can use different functions for different applications of g( ) including variants constructed from a base function (e.g., by hashing the input data with a counter or another value representing the application of g( )).

The encrypting device and decrypting device also have a cryptographic, collision-resistant, one-way hash function h( ) (e.g., employed as a segment hashing function), which may be (but is not necessarily) distinct from the operations $f_i$( ) and from g( ).

In an exemplary embodiment, each of the operations $f_i$( ) g( ), and h( ) is constructed from a common cryptographic hash function by computing each operation as the cryptographic hash of an operation identifier and the input data. The operation identifier may, for example, be a zero-terminated string consisting of "f#", "g" or "h" where # is the value of i for a given $f_i$( ) such that the operation identifier for $f_0$( ) would be "f0". The HMAC of an operation identifier using the input as a key may also be used to implement these operations. Hash functions usable with the techniques of this patent include, without limitation, MD5, SHA-1, SHA-256, SHA-512, any SHA3 candidate operation, as well as combinations of the foregoing and constructions using the foregoing (such as HMAC). As used herein, each of the functions BLAKE, Blue Midnight Wish, CubeHash, ECHO, Fugue, Grostl, Hamsi, JH, Keccak, LANE, Luffa, Shabal, SHAvite-3, SIMD, and Skein is a "SHA3 candidate operation". In other embodiments, the hash function is derived using other well known constructions such as, without limitation, Matyas-Meyer-Oseas, Davies-Meyer, Miyaguchi-Preneel, Merke-Damgard, etc, that convert block ciphers such as AES, DES or other ciphers into a hash function. Transformations that are not collision-resistant (such as MD5, reduced-round variants of hash transformations, or other mixing operations) can also redistribute entropy present in the input, but would be less attractive for use as the one-way function h( ).

Still other embodiments may utilize stream ciphers, potentially including lightweight and potentially cryptographically weak stream ciphers, in implementing entropy redistribution operations $f_0 \ldots f_{b-1}$( ). For example, the stream cipher RC4 may be employed, where the entropy redistribution operation input is used as the RC4 key and the RC4 output bytes are used as (or used to form) the entropy redistribution operation output.

The encrypting device and decrypting device have a secret key encryption function (or set of functions) ENC( ) with a corresponding decryption function DEC( ). In some embodiments, such as those with fixed-length messages, ENC( ) and DEC( ) may utilize conventional cipher constructions such as AES in ECB or CBC mode. Constructions of ENC( ) and DEC( ) for other embodiments are described later with respect to FIG. 13 and FIG. 14, respectively.

Exemplary Embodiment in FIGS. 1 and 2

This section describes an exemplary embodiment of the general technique for verifiable leak-resistant encryption and decryption. This first exemplary embodiment uses key chaining and ciphertext hash chaining.

Encryption

For convenience, following the traditional nomenclature in cryptography, we use the term "plaintext" to refer to the data to be encrypted. As those skilled in the art will understand, this does not necessarily mean that the input data is human-readable, and indeed, nothing precludes such data from itself being compressed, encoded, or even encrypted, prior to its being protected with the techniques of this patent. Similarly, those skilled will understand that the term "data" encompasses any quantity being processed, and could include, without limitation, content, data, software, code, and any other type of information.

Given a sensitive plaintext data message D to be protected, and with knowledge of a shared base secret cryptographic value $K_{ROOT}$, the encrypting device performs the following steps, as outlined in FIG. 1. First it decomposes the sensitive plaintext data D into a sequence of L segments $D_1, \ldots D_L$ (step 100), where (L≧1), each of which is small enough to fit into the memory for incoming segments in the receiver(s). In addition, the size of each of these segments should be sufficiently small to meet the leakage requirements of the application and implementation. The segments can be, but are not necessarily, the same size. In addition, other variants can also support segments of unlimited size by changing keys (e.g., within ENC( ) and DEC( )) as will be shown below with respect to FIGS. 13 and 14.

The encrypting device also generates (step 101) a nonce N which (as will be shown below) may be used as a message identifier (or a precursor thereto) for use in connection with the encryption of D. For example, the nonce could be generated using a true random number generator, a pseudorandom number generator, some combination of true and pseudorandom number generators, a counter value or other (preferably unique or seldom-repeating) parameter, or by deriving N from keys and/or data (including without limitation D, e.g., by setting N to the hash of part or all of D) available to the encryption device. In FIG. 1, for a given $K_{ROOT}$, the value of N used to encrypt a particular message is preferably not used to encrypt any other message (or if so, any reuse should be limited, unlikely and/or infrequent).

In the exemplary embodiments that follow, a message identifier $H_1$ is formed using nonce N. In the most straightforward implementation, in which N serves as the message identifier, $H_1$ may simply equal N. As another example, in which N serves as a precursor to the message identifier, the encrypting device could compute $H_1$ (step 102) as the hash of N using the function ho. Hashing is useful in situations where one wishes to produce a fixed-size message identifier, for example, to permit the incorporation of longer data values (such as text strings) while operating on shorter quantities for computational efficiency, or to convert variable-length data values to a uniform length message identifier for computational simplicity, or to reduce any ability adversaries may have to influence the selection of $H_1$. Of course, hashing is only one way to produce the message identifier, and those skilled in the art will appreciate that functions other than h may be employed to produce $H_1$.

After computing $H_1$, the encrypting device computes a message key, $K_{MESSAGE}$, using the shared base secret cryptographic value $K_{ROOT}$ and $H_1$ (103) as input to a leak resistant, key-tree-based key derivation process. For convenience of discussion, the key derivation process is presented here in the context of encryption (e.g., performed by the encrypting device), and more specifically, in the context of the first exemplary encryption process of FIG. 1. However, the same key derivation process will also be used in the first exemplary decryption process of FIG. 4, in which case it will be performed by the decrypting device. Similarly, the key derivation process will also be used in connection with other processes, including the exemplary encryption processes of FIGS. 5, 11 & 13, and the exemplary decryption processes of FIGS. 6, 12 & 14.

An exemplary key derivation process is diagrammed in FIG. 2. The process begins with a starting point of the tree, which is denoted $K_{START}$ (201), and a path $P_1 \ldots P_Q$ (202). For example, in FIG. 1 step 103 above, $K_{START}$ is the value of the shared secret key $K_{ROOT}$ and path $P_1 \ldots P_Q$ (202) is determined by $H_1$. (The conversion of $H_1$ into $P_1 \ldots P_Q$ is discussed below.) The path specifies a succession of entropy redistribution operations to be applied to $K_{START}$.

In an exemplary implementation, message identifier $H_1$ is decomposed into Q parts $P_1, P_2, \ldots, P_Q$. In an exemplary decomposition, each part $P_i$ is an integer from 0 thru (b−1) (e.g., if b=4 then each $P_i$ is a two-bit value (0, 1, 2, or 3)). Likewise, if b=2, each $P_i$ is a single bit (0 or 1). Hence, the path parts $P_1 \ldots P_Q$ can be used to specify a specific path from $K_{START}$ to $K_{START,PATH}$ by applying functions $f_0(), f_1() \ldots, f_{b-1}()$ to produce a plurality of intermediate keys leading to $K_{START,PATH}$ as follows. First, the function $f_{P_1}$ is applied to $K_{START}$ (203) to yield an intermediate key $K_{START,P_1}$, followed by the application of $f_{P_2}$ on $K_{START,P_1}$ to yield the intermediate key $K_{START,P_1,P_2}$ (204) and so on, until the final application of $f_{P_Q}$ on the intermediate key $K_{START,P_1,P_2,\ldots,P_{Q-1}}$ (205) to yield the final derived key, $K_{START,P_1,P_2,\ldots,P_Q}$ (206). Note that the derivation of each intermediate key depends on at least one predecessor key (e.g., in the case of FIG. 2, its immediate parent) and the relevant portion of the message identifier. For convenience, we shall denote this final derived key with the notation $K_{START,PATH}$ (indicating the key that was reached by starting with $K_{START}$ and following PATH). Likewise, in the case of FIG. 1 step 103, the final derived key (the message key which is assigned to $K_{MESSAGE}$) is denoted $K_{ROOT,H_1}$ since the starting key is in fact $K_{ROOT}$, and the path is in fact $P_1, P_2, \ldots, P_Q$ which is simply the decomposition of $H_1$. (In alternate embodiments, $K_{MESSAGE}$ may be derived from $K_{ROOT,H_1}$, e.g., by hashing $K_{ROOT,H_1}$. Either way, $K_{MESSAGE}$ is based on $K_{ROOT,H_1}$.)

At step 104, the data segment(s) are encrypted using at least one cryptographic key based on said message key $K_{MESSAGE}$, producing ciphertext $E=E_1, \ldots, E_L$ is from the input segment(s) $D=D_1, \ldots, D_L$. An exemplary embodiment for step 104 is shown in FIG. 3, which depicts the steps and states involved in computing the encrypted segments $E_1, \ldots, E_L$.

The process of FIG. 3 uses $K_{MESSAGE}$ to compute L individual segment encryption keys, $K_i$ (i=1 to L), each key being used to encrypt a corresponding segment $D_i$ (i=1 to L) of the secret message data D. First, the function g( ) is applied to $K_{MESSAGE}$ to yield $K_1$ (302), the encryption key to be used for the first segment. Then, the function g( ) is applied to the key $K_1$ to yield $K_2$, the encryption key for the second segment (303), and so on. Finally, the function g( ) is applied to key $K_{L-1}$ to produce $K_L$ the encryption key for the final segment (305). We refer to this type of process as key chaining because the encryption keys are chained to one another.

After the L keys $K_1, \ldots, K_L$ for encrypting the L segments have been determined, the encryption of the segments proceeds as follows. The final (L'th) segment is processed first, where the plaintext input (306) to the ENC( ) function is the L'th data segment $D_L$, concatenated with message integrity value computed by cryptographically hashing the entire plaintext $D_1 \ldots D_L$. (The inclusion of the hash of $D_1 \ldots D_L$ is optional; embodiments may omit this, or concatenate other data such as sequence of '0' bytes or some other form of padding). This L'th plaintext segment is encrypted by the key $K_L$ to yield the encrypted segment $E_L$ (307).

Next, the L−1'th segment is processed at (308) by applying the hash function h( ) to $E_L$, appending this hash value to data segment $D_{L-1}$, and using the result as the encryption input to the L−1'th segment. At (309), the L−1'th plaintext segment is then encrypted using the key $K_{L-1}$ to yield encrypted segment $E_{L-1}$. This process is repeated for the other segments. For instance, the encryption input (310) corresponding to the second plaintext segment is composed of the second data segment $D_2$ followed by $h(E_3)$; the hash of the third encrypted segment, and input (310) is then encrypted using the key $K_2$ to yield the encrypted segment $E_2$ (311). Finally, the encryption input (312) corresponding to the first plaintext segment is composed of the first data segment $D_1$ followed by $h(E_2)$, the hash of the second encrypted segment (311), and input (311) is then encrypted using the key $K_1$ to yield the encrypted segment $E_1$ (313). (As a variant of the foregoing, the subsequent segment hashes do not need to be encrypted, e.g., $E_i$ could be formed by encrypting $D_i$ then concatenating the encryption result with the hash of $E_{i+1}$.)

The encrypted segments $E_1 \ldots E_L$ form the ciphertext E. Step 104 in FIG. 1 is then completed. Using the hash of each $E_{i+1}$ in the computation of $E_i$ effectively chains together the encrypted values, which serves to enable decrypting devices to detect modified (or defective) ciphertext segment(s) prior to decrypting the defective segment(s). We refer to this as "ciphertext hash chaining." In the example shown above, each ciphertext segment $E_i$ (1<i<L) depends on the hash of the next ciphertext segment, e.g., a validator V is used to authenticates the hash of the first ciphertext segment ($E_1$), then $E_1$ yields (after decryption to $D_1$ if necessary) the expected hash of $E_2$. Likewise, $E_2$ yields (after decryption if necessary) the hash of segment $E_3$, and so forth.

Note that the process of FIG. 3 can still be performed where all the data is in one segment (i.e., L=1) (e.g., because the input message is small or an encryption process ENC( ) such as the process shown in FIG. 13 is employed). For the L=1 case, only $K_1$ is required and $K_1=g(K_{MESSAGE})$. Alternately, $K_{MESSAGE}$ may be used directly as $K_1$, in which case the operation g( ) can be omitted altogether. As described above, inclusion of the hash of $D_1 \ldots D_L$ (which, in this case, would just be $D_1$ since L=1) is optional. The result of the process $E=E_1$, since this is the only segment.

Referring back to FIG. 1, after the data segments $D_i$ have been computed, a validator V is computed that will enable authorized recipients of the encrypted message to authenticate the ciphertext prior to decryption. First, a value $H_2$ is calculated (105) as the hash of the first encrypted segment $E_1$. Recall that the first segment $E_1$ incorporates the hashes of all other segments. Thus, the hash of $E_1$ actually reflects the contents of all the segments, including segment $E_1$, and can be used to verify that none of the segments has been changed. (Optionally, in addition to $E_1$, the input to the hash producing $H_2$ may also include additional information about the message, such as the length, version number, sender identity, value of N, etc.).

Next, the encrypting device uses a secret key to compute V (106), which is a validator of the message identifier and ciphertext segment(s) $E_i$. Validator V is computed using the hash of at least one ciphertext segment (e.g., the hash $H_2= h(E_1)$) and an initial secret (e.g., $K_{MESSAGE}$, or other values as described in the following paragraph). Computation of V may be performed using the leak resistant, key-tree-based key derivation process described in FIG. 2, with the starting key $K_{START}$ being $K_{MESSAGE}$ and the path being determined using $H_2$ (106). Thus, the derivation of V includes computing a plurality of successive intermediate values leading to V, where each depends on at least one predecessor (e.g., in the case of FIG. 2, its parent value) and the relevant portion of the hash (e.g., $H_2$). Note that the functions $f_i()$, the value b, etc. may be (but are not required to be) the same as were used in (103). This process results in the derivation of the key $K_{MESSAGE,H_2}$ which is (or is further processed to form) the validator V.

The foregoing description commenced with $K_{MESSAGE}$ in deriving the validator, but alternate embodiments may start with a different value. For example, the key $K_{MESSAGE}$ at step 104 and the key $K_{MESSAGE}$ at step 106 may be different from each other but both derived from $K_{ROOT,H_1}$. Likewise, the key used at step 106 may be derived from the $K_{MESSAGE}$ used at step 104, or vise versa, or a different base key (besides $K_{ROOT}$) may be employed as $K_{START}$. Of course, $K_{ROOT}$ itself may even be used as $K_{START}$ (e.g., if $H_2$ is a hash of N and/or $H_1$ and one or more ciphertext segments).

The validator, as utilized in this patent, is a verifiable cryptographic proof that some putative ciphertext is an unmodified version of an encryption of some plaintext message data associated with a particular message identifier, and was produced by an entity with access to a secret cryptographic value. The validator constructed at step 106 can be conveniently validated by a recipient, such as a decryption device, in a manner that avoids susceptibility to differential power analysis and related external monitoring attacks. In addition, the validator creation process (i.e., the performance of step 106) also enables the encryption device to avoid susceptibility to differential power analysis and related external monitoring attacks.

After computing the validator, the encryption process is complete. At step 107, the result is output. The output data consists of the information (if any, e.g., nonce N) required to enable a recipient to derive the message identifier, the validator V, and the encrypted result E (comprising encrypted segments $E_1, \ldots, E_N$). By combining key chaining and ciphertext hash chaining, this type of encryption process is able to yield cryptographically-strong output with message authentication, while avoiding the re-use of secret keys located in the encrypting device in ways that would facilitate differential power analysis and related attacks against the encrypting device. The encryption result is created in a form which enables a decryption device to perform the decryption without re-using secret keys in ways that would facilitate differential power analysis and related attacks against the decryption device. The key-tree process limits the re-use of keys in the formation of $K_{MESSAGE}$ and the validator V, while the ciphertext hash chaining method limits the use of keys used in the data encryption.

The next section explains how the output data can be subsequently decrypted by the decrypting device.

Decryption

FIG. 4 shows an exemplary decryption process corresponding to the exemplary encryption process of FIGS. 1 and 3. As stated earlier, this requires that both the decryption device and the encryption device have the ability to derive the same message identifier (e.g., because each device knows nonce N it can compute $H_1$), base secret cryptographic value $K_{ROOT}$, cryptographic functions f( ), g( ) and h( ). The exemplary decryption process will use the same key derivation process (and key chaining) depicted in FIG. 2.

The exemplary decryption process begins at step 400 with obtaining (e.g., over an untrusted digital interface) the putative result of the encryption (namely, the message identifier (e.g., nonce N), the validator V, and the encrypted result E comprising segments $E_1, \ldots, E_N$). At step 401, the device next computes the value $H_1$ by hashing the received nonce N. Note that, unless the nonce was received incorrectly, the derived $H_1$ will equal the $H_1$ used in the encryption process. At step 402, the decrypting device computes the value $H_2$ by hashing the segment $E_1$ (and, if previously used during the encryption, other information about the message that was incorporated into the derivation of $H_2$). At step 403, the device attempts to compute the message key, $K_{MESSAGE}$, using the leak resistant, key-tree-based key derivation process described in FIG. 2, with $K_{START}=K_{ROOT}$ and PATH=$H_1$. At step 404, the device computes the expected validator V', by using the same leak resistant, key-tree-based key derivation process as the encrypting device (e.g., the process in FIG. 2 using the key $K_{START}=K_{MESSAGE}$ and PATH=$H_2$). At step 405, the computed value V' is compared with the received validator V. If the expected validator V' does not match the provided validator V, the process terminates with an error (step 406) since the provided data may have been corrupted or maliciously modified, or some other error has occurred.

If the check at step 405 is successful, then the process moves to step 407 where a counter i is initialized to the value 1, a key register K is initialized to the result of computing $g(K_{MESSAGE})$ which is the key for decrypting the first encrypted segment $E_1$ (i.e., the value of $K_1$ which is labeled 302 in FIG. 3). Also at step 407, a variable H is initialized to $H_2$. The following operations are then performed in a loop as shown FIG. 4. First, the hash of the next ciphertext segment to be decrypted (i.e., $h(E_i)$) is computed and compared with the expected hash H (step 408). If the comparison fails, the encrypted segment has been altered, so the process terminates with an error (409) and no further decryption is performed. If the comparison succeeds at step 408, the segment $E_i$ is decrypted at step 410, using the decryption function DEC( ), with the key K to yield the decrypted segment, which is interpreted as containing the plaintext $D_i$ followed by the purported hash of the next ciphertext segment. H is set to this purported hash value. Next, at step 411, a check is performed to see if all the L segments have been decrypted (i.e., whether the counter i equals L). If the counter has not yet reached L, then in step 412, the counter i is incremented and the register K is updated to the decryption key for the next segment by computing K=g(K), and the process is repeated from step 408 onwards. If step 411 determines that i has reached L, a check is performed at step 413 to see if H equals the expected pad data (e.g., the hash of $D_1 \ldots D_L$). If this check fails, the decryption ends with a failure condition (414). If the check succeeds, then the decryption process is successful and the recovered decrypted output $D=D_1, \ldots, D_L$ is returned at step 415.

Note that in this embodiment, the decryption process can be done in a streaming manner (i.e., the decryption device could initially obtain N, V and $E_1$ and then receive the remaining segments $E_2, \ldots, E_L$ one at a time), and still be able to carry out the steps outlined above. Streaming operation is, for example, useful if the decrypting device lacks sufficient memory to hold the entire message, or if initial portions of the decrypted data need to be available before the all of the data has been received and decrypted.

Second Exemplary Embodiment

This section describes a second exemplary embodiment of the general technique for verifiable leak-resistant encryption and decryption. In contrast to the first exemplary embodiment which used ciphertext hash chaining, the second exemplary embodiment uses plaintext hash chaining. However, in both cases, the re-use of keys is controlled at both the encrypting device and the decrypting device to prevent differential power analysis and related attacks.

Encryption

The second exemplary embodiment of encryption by the encrypting device is shown in FIG. 5 which, for the sake of conciseness, is depicted as a combined process diagram and state diagram. The encrypting device creates or obtains the message to encrypt, D, and a message identifier N, which may be a counter, randomly-generated value, plaintext hash, etc.

The input message D is divided into a sequence of segments $D_1, \ldots, D_L$ (although L=1 is permitted), and these segments are used to create the plaintext segments $B_1, \ldots, B_L$ as follows. First, segment $B_1$ (501) is formed by concatenating message segment $D_1$ with the hash of any desired message data (denoted as X, which may include elements such as length L, Message identifier N, a transaction identifier or counter, etc.) Next, $B_2$ (502) is formed by concatenating $D_2$ with $h(B_1)$ (i.e., the hash of $B_1$). Each subsequent $B_i$ up to $B_{L-1}$ is then formed by concatenating $D_i$ with the hash of $B_{i-1}$. Finally, the last plaintext segment $B_L$ (504) is formed by concatenating $D_L$ with $h(B_{L-1})$.

The next steps of the process (505-508) generate encryption keys for each of the plaintext segments using a key chaining process so that, similar to the first exemplary embodiment, each encryption key is directly or indirectly based on the message key. In the second exemplary embodiment, the first encryption key $K_1$ is simply set to the value of message key $K_{MESSAGE}$ derived (505) by computing h(N) and then $K_1 = K_{MESSAGE} = K_{ROOT,h(N)}$ using the leak resistant, key-tree-based key derivation process as described in FIG. 2 with $K_{START} = K_{ROOT}$ and PATH=h(N). Key $K_i$ for i>1 is computed as $g(K_{i-1})$, where g( ). Thus, the second key $K_2$ is the result of computing $g(K_1)$ (506). This process is repeated so that the L−1'th key ($K_{L-1}$) is computed as $g(K_{L-2})$ (507), and the final segment key $K_L$ is computed as $g(K_{L-1})$ (508).) Thus, every key $K_i$ is based on (e.g., equal to or derived using) the message key $K_{MESSAGE}$.

The next step in the process is the encryption of each of the plaintext segments $B_1, \ldots, B_L$ with the corresponding keys $K_1, \ldots, K_L$ to yield the encrypted segments $E_1, \ldots, E_L$. For instance, encrypted segment $E_1$ is created by encrypting $B_1$ with $K_1$ (509), $E_2$ is created by encrypting $B_2$ with $K_2$ (510), and so on, with $E_{L-1}$ created by encrypting $B_{L-1}$ with $K_{L-1}$ (511), and $E_L$ is created by encrypting $B_L$ with $K_L$ (512). The encrypted result E consists of the segments $E_1, \ldots, E_L$.

The next step in the process is the computation of the validator V for the encryption (513). First, the hash function h( ) is used to compute $h(N\|E_1\| \ldots \|E_L\|h(B_L))$, where "$\|$" denotes concatenation. Next, $Z = h(N\|E_1\| \ldots \|E_L\|h(B_L))$ is computed, then $K_{ROOT,Z}$ is computed using leak resistant key-tree-based key derivation process (e.g., as described in FIG. 2, with $K_{START} = K_{ROOT}$ and the PATH=Z). The validator V is then computed as the hash of the key tree result (i.e., $h(K_{ROOT,Z})$). Finally, the result of the encryption process is provided, comprising N, $h(B_L)$, E, and the validator V (514).

The encryption process above can be employed in systems where the input data D arrives by streaming, or where for other reasons D cannot be processed all at once (e.g., because of memory limitations). In this case, the encrypting device commences by obtaining N, h(X), and $K_1$. In addition, a running hash computation is initialized with N.

1. Create or obtain N
2. Initialize running hash calculation
3. Let H=h(X)
4. Let K=$K_{ROOT,h}$(N)
5. Update running hash calculation with N
6. Let i=1
7. Receive input data $D_i$ (e.g., streaming in)
8. Create $B_i$=concatenation of $D_i$ and H
9. Let H=h($B_i$)
10. Create $E_i$=ENC(K, $D_i$)
11. Update running hash calculation with $E_i$
12. Output $E_i$
13. Increment i
14. If more there is input data, go to step 7
15. Update running hash calculation with H
16. Finalize running hash calculation and store in Z
17. Compute V=h($K_{ROOT,Z}$)
18. Output H (which equals h($B_L$)), N, V Decryption The process of decryption is illustrated in FIG. 6. At step 600, the decrypting device receives (typically from an untrusted interface) the purported results of the encryption process, namely E, $h(B_L)$, nonce N, and validator V. The decrypting device divides E into $E_1, \ldots, E_L$, initializes a counter i to be 1, and sets a register H to be the received value hash $h(B_L)$. The length of the message L is also received or determined (e.g., if a segment size of 1 kilobyte is used for all but the last segment, which may be less than 1 kilobyte, then L is the length of the message in kilobytes, rounded up). At step 605, the decrypting device computes $Z=h(N\|E_1\| \ldots \|E_L\|H)$, where "$\|$" denotes concatenation. At step (610), the decrypting device computes the value of $K_{ROOT,Z}$ using the leak resistant key-tree-based key derivation process described in FIG. 2, with the root being $K_{START} = K_{ROOT}$ and the PATH=Z, and then hashes the result to yield $h(K_{ROOT,Z})$. At step 620, it compares the computed $h(K_{ROOT,Z})$ with the received validator V. If the result does not equal V, there is data corruption and the process is stopped at 611 without performing any decryption. If the check succeeds, then at step 620 the decrypting device computes h(N), then initializes key register K with the result of computing $K_{ROOT,h(N)}$ using the leak resistant key-tree-based key derivation process described in FIG. 2, with $K_{START} = K_{ROOT}$ and PATH=h(N) and sets a counter i to be 1.

Next, the following operations are performed in a loop: At step 630, the segment $E_i$ is decrypted with the key in key register K to produce a plaintext segment $B_i$ which consists of a data segment $D_i$ and a hash value. At step 640 the hash from of the decrypted current segment is checked. For the first segment (i.e., i=1), the hash is compared against h(X), where X consists of the same fields as X during encryption. For segments after the first one (i.e., i>1), the hash from $B_i$ is compared against the hash of the prior segment (i.e., $h(B_{i-1})$). If the comparison fails, the decryption process fails at step 641. Otherwise, at step 650, the message portion of $B_i$ (i.e., $D_i$) is added to the output buffer (e.g., in RAM), and key register K is advanced to the next segment key by computing g(K) then storing the result in K. The counter i is also incremented by 1. At step 660, the value of i is compared with L and, if the value of i does not exceed L, the decryption process loops back to step 630. Otherwise, the decryption process is complete and at step 670, where the hash of the last plaintext segment (i.e., $h(B_L)$), is compared to the received hash H. If the comparison at step 670 fails (i.e., the values are not equal), an error has occurred and the decryption fails (step 671). Otherwise the result data $D_1, \ldots, D_L$ are output in step 680.

In this embodiment, the hashes of the plaintext are chained, with plaintext segment $B_i$ containing the hash of the plaintext $B_{i-1}$. This chaining, while not strictly necessary for leakage resistance, provides the additional property that any faults that occur during the decryption process can be detected because the plaintext is verified to be that same as what was encrypted. Thus, this embodiment is advantageous for use in environments where there is potential for corruption the decryption process.

Systems, Applications, and Variants

Up to this point, this patent has described a general technique for leak-resistant encryption and decryption, together with some exemplary embodiments of that technique. This section will describe some exemplary systems and/or applications in which the foregoing can be utilized, as well as additional variants of aspects of the exemplary embodiments described above.

Secure Firmware Loading

FIG. 7 shows the application of verifiable leak-resistant cryptography for securely loading sensitive firmware on a central processing unit (CPU), e.g., as part of a so-called system on a chip (SoC). For convenience, depending on context, the reference numerals may refer to steps in a process, and/or to quantities used (or produced) by such process steps. In this embodiment, the SoC consists of a single integrated circuit (700), containing a CPU (703), and various types of memory. The memories may include, without limitation, random access memory (RAM) (701) from which code may be executed, read-only-memory (ROM) (704) containing trusted bootstrap code, and a secret state storage memory (702) that holds a shared cryptographic secret $K_{ROOT}$. The key storage memory could be implemented using a variety of techniques, such as, without limitation, fuses/antifuses, battery backed RAM, and EEPROM. The SoC may have an external power input (707) which may receive power from an untrusted source (e.g., potentially under the control and/or observation of adversaries). An externally supplied clock (708) may also be received (and may be used with PLLs to form additional clocks). The SoC has a cryptographic hardware component (705) with an AES engine for data encryption and decryption, a hash function engine, such as, without limitation, a SHA-1 or SHA-256 or a AES based hash function engine, and an implementation of the leak resistant, key-tree-based key derivation process based on FIG. 2, with functions $f_0( ) \ldots, f_{b-1}( )$ implemented using the hash function and/or the AES function or their variants. It should be obvious to those skilled in the art that, in other embodiments, the entire functionality of the cryptographic hardware component (705), or some subset thereof could be performed by in software (e.g., by the CPU).

Upon bootstrap from the trusted bootstrap code in ROM, the SoC loads its sensitive software/data, over an untrusted interface (706), from an external, untrusted storage device, which in this embodiment is flash memory (709). To protect the sensitive software/data from disclosure or unauthorized modification, it is encrypted using the verifiable leak-resistant techniques (e.g., as shown in FIG. 1 or 5) by a device manufacturer or other code issuer using the shared secret cryptographic value $K_{ROOT}$. The encryption result is stored in the flash memory (709). The SoC first loads the encrypted code/data from the flash memory (709) to its internal RAM (701). It then performs the leak resistant decryption (e.g., as shown in FIG. 4), where the process is implemented in the trusted bootstrap code store in ROM (704) cryptographic hardware component (705), and is performed using the shared secret key $K_{ROOT}$ from keystore (702). If successful, this process creates a validated and decrypted sensitive code/data image within RAM memory (701), which may then be executed. In case the decryption process fails, the encrypted code/data (and any partially decrypted code/data) in RAM is flushed and the operation restarted from the beginning when required.

In an optional enhancement to this embodiment, security is complemented by storing a minimum acceptable software version number in fuses, battery backed memory, or other local storage of the device onto which the software is to be loaded. All software to be loaded into the device would carry a version number, and the device would only accept software with a version number greater that the minimum. In addition, some software versions might specifically instruct the SoC to update the minimum acceptable software version number, thereby preventing malicious rollback of software to a prior version that was deemed unacceptable. The foregoing anti-rollback methods could be implemented independently of (i.e., as an adjunct to) the verifiable leak-resistant operations. Alternatively, the anti-rollback methods could be implemented as part of the message identifier, the validator, or the other secured quantities used in the verifiable leak-resistant operations.

Those with ordinary skill in the art will easily recognize that SoC applications are not limited to the specific architecture presented herein, and SoCs or other devices with a different internal architecture and/or components from the embodiment presented in FIG. 7 may be protected.

For example, FIG. 8 shows the application of verifiable leak-resistant cryptography to a secure processor architecture (800). For convenience, depending on context, the reference numerals may refer to steps in a process, and/or to quantities used (or produced) by such process steps. In this setting, the device contains a CPU, a keystore that holds internal secret state including a base secret cryptographic key $K_{ROOT}$. Non-volatile storage, such as, without limitation, fuses (801) may be employed for storing the internal secret state. The cryptographic hardware subcomponent (804) encrypts and/or integrity protects and/or replay protects all data moving out of the on-chip data/instruction cache (803) to external insecure RAM memory (806), and decrypts and/or integrity checks and/or replay checks all data being fetched from external insecure RAM memory. In addition, all code is stored in encrypted and integrity protected form in the insecure flash (805) and is decrypted and integrity checked when brought into the on-chip data/instruction cache (803). Exemplary processor architectures of the background art whose security could be improved through the addition of verifiable leak-resistant cryptography include, without limitation, the Secure Blue design from IBM (announced in an IBM press release entitled "IBM Extends Enhanced Data Security to Consumer Electronics Products" on Apr. 6, 2006) and the AEGIS design from MIT (described in AEGIS: Architecture for Tamper-evident and Tamper-resistant Processing, Proceedings of the 17th Annual International Conference on Supercomputing, pages 160-171, 2003).

The use of verifiable leak-resistant cryptography substantially improves the security of existing processor designs by providing protection against monitoring attacks. In particular, this embodiment enhances the cryptographic hardware sub-component (804) to include a hash function and a key tree processing capability that reuses the (e.g., AES) encryption capability of an existing secure processor design and implements the steps and method of the first exemplary embodiment to create a secure leak-resistant secure processor. In particular, any data written from cache (803) to the RAM memory (806) is encrypted using the leak resistant encryption process (e.g., as shown in FIG. 1) and any code read from untrusted flash (805) and untrusted RAM is decrypted using the leak resistant decryption process outlined in FIG. 4. When data are written to a particular segment, a counter corresponding to the segment is incremented, and the counter value is incorporated in the encryption and/or integrity check creation process for the segment, thereby enabling the detection of attacks that involve substitution of old data.

FPGA Bitstream Loading

The logic to be loaded into a field programmable gate array (FPGA) often contains highly sensitive trade secrets, cryptographic secrets, and/or other sensitive information that needs to be protected from disclosure or copying. This loaded logic, or upgraded logic is typically supplied to the FPGA as a bitstream from an external source, such as, without limitation, a flash memory device or a CPU or some other source (907).

Some FPGAs contain nonvolatile memory for storing configuration data, while others must be re-loaded each time the chip is powered on. Existing FPGAs have the ability to decrypt bitstreams, typically using a key that is held a battery-backed memory or stored locally (such as using on-chip flash, EEPROM, or fuses). The FPGA decrypts the supplied encrypted bitstream before (or while) installing it into the programmable slices present within the FPGA. Differential power analysis attacks and related external monitoring attacks can be attempted against the bitstream decryption processes, posing a serious security risk as a successful attack can result in disclosure of the bitstream decryption key and/or the bitstream itself.

Referring to FIG. 9, verifiable leak-resistant cryptography can be used to create a secure bitstream decryption capability on an FPGA. Prior to decryption, the sensitive bitstream is encrypted by an external device (using software, hardware or some combination thereof) using a leak-resistant encryption process (e.g., as described in the first exemplary embodiment), producing the encrypted bitstream. The encrypted bitstream may be located (907) in an untrusted memory, such as an external flash or hard drive, or retrieved from an untrusted source such as a CPU etc.

Within the FPGA, the cryptographic secret $K_{ROOT}$ for leak-resistant decryption is kept in the keystore (902) which stores the internal secret state, and which may be implemented using technologies such as, without limitation, fuses, battery-backed RAM (902, 903), EEPROM, flash, etc. The FPGA (900) receives the encrypted bitstream over interface (906). This bitstream could, for example, have been encrypted using either of the first embodiment or the second exemplary embodiment (corresponding to FIGS. 1 and 5).

If the embodiment of FIG. 1 was used for encryption, the FPGA first receives nonce N, validator V, length L, and initial segment $E_1$. $E_1$ is stored in encrypted segment buffer (905). Using a leak-resistant decryption process as described above (e.g., see FIG. 4), the hash of $E_1$ is computed, and validator V is verified, with $K_{ROOT}$, L, and the hash, yielding (if successful) $K_{MESSAGE}$ or a fatal error (in which case the process halts). If successful, the FPGA uses the segment decryption processing component (904) to perform the leak resistant decryption process on $E_1$. The decryption of $E_1$ yields the hash of segment E2, which is loaded, verified, and decrypted. The process continues one segment at a time, until the final segment is decrypted and verified. If an error occurs, the process halts and all partial FPGA decrypted data are wiped. (Upon failure the process can be re-started again from the beginning.) One or more status registers 910 are used to track the status of the bitstream loading process (e.g., tracking whether the process is in-progress, failed, or complete). The status can also be exported for diagnostic purposes and for use by external components. Once all segments have been loaded successfully, the FPGA is now configured and can be used (e.g., the FPGA can now permit I/O, clocking, etc. to be applied to the loaded bitstream image). FPGA operation can be prevented until the bitstream is fully loaded (e.g., to avoid revealing information about an incomplete FPGA image and to avoid unpredictable behavior of the overall circuit arising from incorrect FPGA configuration).

If the second embodiment of FIG. 5 was used for encryption, the FPGA first receives E, V, N, and $h(B_L)$, and stores E in a buffer. The FPGA's segment decryption processing component 904 then uses the method described in FIG. 6 to validate and decrypt the provided encrypted segments. Status register(s) 910 are used to track the status of the bitstream loading, validation, and decryption processes, and any serious error results in the halting of the process and the wiping of any partial decrypted data.

Network Communications and Other Packet-Based Applications

FIG. 10 shows the application of verifiable leak-resistant cryptography to protecting network communications from external monitoring attacks. In this embodiment, multiple network devices, such as Device A (1000), Device B (1030) and Devices C, D, E, etc. (1040) communicate with each other over a network (1020). Some or all of these communications may contain sensitive information, making it useful to encrypt and authenticate the data. Moreover, some of these devices (such as Device A in this embodiment) are required to protect their cryptographic computations and keys from external monitoring attacks.

Device A has a keystore (1001) to store a table of shared cryptographic root keys with other devices it needs to communicate with. These keys may have been previously stored, or may be negotiated (e.g., using public key cryptography). Methods for using public key cryptosystems to negotiate keys are well known in the background art, and are utilized in protocols such as SSL and IPSEC. This embodiment could easily be integrated into these or other protocols.

Outbound packets or data segments to be encrypted originate from an application, operating system, driver, or other component (1002) and enter plaintext packet buffer (1003). Each packet is then processed using the segment encryption/decryption processing component (1004), where it is encrypted using a verifiable leak resistant encryption method (e.g., as described in FIG. 1). The root key for this encryption is the shared key between Device A and the destination device, which is obtained from the keystore (1001). For this processing, the message identifier nonce N may be any (preferably) unique value, including a counter. For example, the nonce could equal a packet identifier, a TCP sequence number with possibly the incorporation of additional most-significant bits to prevent overflows), the hash of a value, a random value, etc. For each packet, the leak resistant encryption operation produces an encrypted segment and a validator V. The nonce may be transmitted or may be implicit (e.g., based on the number of packets received previously). The encrypted segment, V, and any other required data are assembled into an outgoing packet and moved to the network interface component (1006) and then to the network (1020) for routing to the appropriate destination device.

For inbound encrypted packets, it is assumed that the sending device has performed the encryption as described above. These packets are received from the network (1020) by the network interface component (1006) and then moved to the ciphertext packet buffer (1005). Each packet is then processed by segment encryption/decryption processing component (1004), where a leak-resistant decryption process (e.g., as described in FIG. 4) is performed. For this decryption process, (i) the shared key between the receiving and sending device (e.g., $K_{ROOT}$ or a precursor used to derive $K_{ROOT}$) is obtained from keystore (1001), (ii) the nonce N is recovered from the packet or otherwise determined, (iii) the validator is verified against N and the encrypted packet, and (iv) if the validator is correct, the packet data are decrypted. The shared cryptographic secret between Device A and the sending device may be used as $K_{ROOT}$. If the decryption or validation fails, the packet is dropped. Otherwise, upon successful decryption, the decryption result can be provided to the application, operating system, driver, etc.

This process is outlined in FIGS. 11 and 12. FIG. 11 illustrates the verifiable packet level leak-resistant encryption process and FIG. 12 illustrates the corresponding decryption process. The verifiable packet level leak-resistant encryption process is the following: Given an input packet data D (1100) with the source and destination sharing a base cryptographic value $K_{ROOT}$, a message identifier N is generated in step 1101 (e.g., using a random source and/or information present in the packet D and/or some packet identifier such as a sequence number associated with the communication protocol). For TCP/IP communications, N can be constructed from a session identifier, the sequence number (optionally with additional most significant bits appended to prevent rollover), the source port, the destination port, and/or other values. Next, in step 1102, the hash of N is computed. (Optionally, this step may be omitted and N may be used instead of h(N) in deriving $K_{MESSAGE}$.) Subsequently, in step 1103, message key $K_{MESSAGE}=K_{ROOT,h(N)}$ is computed using the leak resistant key-tree-based key derivation process described in FIG. 2, with $K_{START}=K_{ROOT}$ and PATH=h(N). The input packet data D is encrypted with the key $K_{MESSAGE}$ to yield the encrypted result E (1104).

Next the hash of E is computed (1105) (e.g., using SHA-256). Then the validator V for the encryption is computed as $K_{MESSAGE,h(E)}$ (1106) using the leak resistant key-tree-based key derivation process outlined in FIG. 2, with $K_{START}=K_{MESSAGE}$ and PATH=h(E). Finally the output packet is formed to include V, E, and N (or any other information, if any, required to enable the recipient to recover N) (1107). The output data E is then transferred to a remote device (such as a remote computer over the Internet) in a packet.

As an optional optimization, if the encrypting device has multiple packets buffered for sending, it can encrypt multiple packets simultaneously such that only a single validator is required for all packets. For example, the encryption process may be performed as shown in FIG. 3, where each segment $D_i$ is a packet. Combining packets in this manner reduces the number of key tree operations required for both the sender and the recipient.

A corresponding verifiable packet level leak resistant decryption process is illustrated in FIG. 12. Given an encrypted packet including V, E, N (or data sufficient to recover N, e.g., a sequence number), and the shared cryptographic secret $K_{ROOT}$ (1200), the decryption process proceeds as follows: First, the value of h(N) is computed (1201) is computed (or, if the encrypting device used N directly, then this step is omitted). Then the hash of E is computed (1202). Next $K_{MESSAGE}=K_{ROOT,h(N)}$ is computed at step 1203 using the leak resistant key-tree-based approach diagrammed in FIG. 2 with $K_{START}=K_{ROOT}$ and PATH=h(N). Next $V'=K_{MESSAGE,h(E)}$ is computed using the leak resistant key tree process outlined in FIG. 2, with $K_{START}=K_{MESSAGE}$ and PATH=h(E) (1204). Subsequently, the decryption device checks whether V'=V (1205). If they are not equal, processing is stopped for this packet and the packet is discarded (1206). If the check succeeds, then E is decrypted with $K_{MESSAGE}$ to yield D, the plaintext packet (1207) (e.g., using the DEC( ) process shown in FIG. 14).

Smart Card Applications

Verifiable leakage-resistant encryption and decryption can be implemented in smart-cards (e.g., in connection with protocols where the smart-card is required to perform encryption and/or decryption in a manner that is secure from differential power analysis and related external monitoring attacks). Examples of such systems and protocols include, without limitation, the derivation of keys (control words) for the decryption of pay television signals, payments (including off-line payments), identity verification/network login, mobile telephone SIM cards, and transit passes. The exemplary cryptographic techniques disclosed in this patent can be used to ensure that the secret keys within smart-cards are protected from external monitoring attacks while performing such protocols. Smart cards (or other security chips) can also be used to implement part or all of the leak resistant encryption or decryption processes utilized in a larger system, such as if the smart card implements the key-tree based key derivation process of FIG. 3 so that $K_{START}$ never needs to leave the smart card.

Mutual Authentication Applications

In many applications, two or more devices need to authenticate each other and/or exchange sensitive information amongst them. Example applications of such protocols include, without limitation: (i) authentication between a printer and a cartridge to ensure that both devices are genuine and not counterfeit; (ii) authentication between a set-top box and a smart-card to ensure that components are authentic (e.g., to prevent the introduction of stolen video decryption keys); (iii) authentication between a garage door and an opener; (iv) keyless entry systems (such as may be used in cars) which authenticate keys (e.g., prior to unlocking doors or starting the engine); (v) authentication protocols performed by frequently stolen items (such as car radios, GPS units, cell phones, etc.) to prevent stolen or tampered devices from being operated; and (vi) entry systems such as those found in secure buildings that authenticate keys/tokens prior to permitting entry. In these applications, challenge response protocols between the devices have traditionally been used both for mutual authentication and to set up a shared secret key for the exchange of sensitive information. Simple protocols to perform these authentications while resisting DPA can be constructed by using the methods of this patent to perform any required encryption or decryption operations. For example, a device can demonstrate its authenticity using techniques disclosed in this patent through its ability to supply a valid validator and/or decrypt a message.

Segment Encryption and Decryption with Intra-Segment Key Changes

This section describes exemplary variants of the ENC( ) and DEC( ) operations which can be used in place of conventional encryption processes (such as AES in ECB or CBC mode) in implementing the exemplary embodiments (e.g., as shown at step 320 of FIG. 3, step 410 of FIG. 4, step 509 of FIG. 5, step 630 of FIG. 6, step 1104 of FIG. 11, and step 1207 of FIG. 12). In the ENC( ) and DEC( ) variants shown in FIGS. 13 and 14 respectively, the cryptographic keys are changed frequently, for even greater security. Specifically, additional cryptographic key updates occur within the encryption of a data segment $D_i$ to $E_i$ (or vice versa). Accordingly, we refer to these variants as implementing intra-segment key changes.

Other than the changes to ENC( ) and DEC( ) the remainder of the operations in the first and second exemplary embodiments can be implemented as previously described. For example and without limitation, the operations involving the initial message key $K_{MESSAGE}$, the validator V, and so forth, need not be changed.

FIG. 13 shows an exemplary embodiment of an ENC( ) operation for encrypting data segments. FIG. 14 shows a corresponding exemplary embodiment of a DEC( ) operation. In this embodiment, these operations are built using the block cipher AES in cipher block chaining (CBC) mode, but it should be clear to those skilled in the art, that other block ciphers or encryption/decryption primitives or encryption modes could be used as well.

The inputs to the encryption process for segment i are segment key $K_i$ (1301) and data segment $D_i$ (1310). The input data segment $D_i$ (1310) is divided into sub-segments $D_{i,1}$ (1311), $D_{i,2}$ (1312), etc. FIGS. 13 and 14 show the data segment D being divided into sub-segments of 3 AES blocks, although other sizes can also be used and algorithms other than AES may, of course, also be employed. (Smaller sub-segments increase computational overhead, while larger sub-segments cause keys to be used in more operations, increasing the potential for information to leak.) Segment key $K_i$ is transformed with a hash operation m( ) yielding $K_{i,1}$ (1302) which is the key for the first sub-segment $D_{i,1}$. If an initialization vector (IV) (1314) is to be used, it is XORed with the first AES block of $D_{i,1}$. (If no IV is to be used, this XOR step may be omitted. If an IV is used, it can be authenticated, e.g., by incorporating it into the validator computation, or by deriving the IV from a validated value such as a message identifier.) The first bits of ($D_i$ XOR IV) are encrypted with AES (1315) using the segment key $K_{i,1}$ (1302), forming the first portion of ciphertext sub-segment $E_{i,1}$ (1320). This ciphertext portion is also XORed with the next bits of sub-segment $D_{i,1}$ (1311), yielding another AES input which is subsequently encrypted using segment key $K_{i,1}$ (1302) to produce the next portion of sub-segment $D_{i,1}$ (1311). A similar cipher block chaining operation is performed to form the input to the third AES encryption, which is also performed with key $K_{i,1}$. The results of the three AES operations is the ciphertext sub-segment $E_{i,1}$ (1320). The fourth AES operation is performed on the first block of the next data sub-segment $D_{i,2}$, (1312), and a new key is used, notably $K_{i,2}$ (1303), which is derived by applying m( ) to $K_{i,1}$ (1302). The last ciphertext from processing $D_{i,1}$ becomes the IV (1317) for the first portion of $D_{i,2}$ (1312). The encryption process continues until all blocks of all s data sub-segments have been encrypted, ultimately yielding the encrypted sub-segments $E_{i,2}$ (1321), . . . , $E_{i,s}$ (1322), and where a new key is derived using m( ) for each sub-segment. Finally, the ciphertext sub-segments are assembled to form the final ciphertext segment $E_i$ (1330).

Referring to FIG. 14, the decryption process DEC( ) is the reverse of the ENC( ) process. The subkeys $K_{i,1}$ (1402), $K_{i,2}$, (1403), etc. are derived from the segment key $K_i$ (1401) using m( ) via the same process as for encryption above. The encrypted segment $E_i$ is divided into sub-segments, each comprising one or more AES inputs, which are decrypted with the subkeys. After each decryption operation, the appropriate IV (if any) or prior ciphertext is XORed with the data. The final data are assembled to form the sub-segments (1420, 1421, 1432, etc.), which are in turn assembled to form $D_i$ (1430).

The ENC( ) and DEC( ) process above are examples which involve rapid key changes so as to provide greater leakage tolerance. Other segment encryption and decryption methods can be used, including the application of stream ciphers and/or block ciphers (such as RC4, SEAL, AES, DES, triple DES, etc.) in ECB, CBC, or counter (e.g., Galois counter) modes. For such operations where the same key is applied to all the data in a segment, it may be advantageous to limit the size of each segment (e.g., by dividing up the data into sub-segments as shown in FIG. 3) prior to encryption so as to limit that the number of operations performed with each key, thereby reducing the number of operations an adversary can observe being performed with each key.

Communications Channels

Data exchanges described herein may be accomplished in a wide range of possible manners. For example, and without limitation, conventional buses/interfaces (such as I2C, JTAG, PCI, serial I/O (including USB), PCI Express, Ethernet, etc.), wireless protocols (such as 802.11 family, Bluetooth, cellular telephony protocols, ISO14443, etc.), and intra-chip connections (such as APB, direct connections with other flip flops, etc.) may all be used. For each of the foregoing, the sending device(s) and receiving device(s) would have appropriate interfaces (e.g., interfaces of the foregoing types) with can send, receive, or send and receive (as appropriate).

Alternate Forms of Data Validation Prior to Decryption

The exemplary embodiments presented thus far, have utilized the leak-resistant key-tree-based key derivation process (e.g., as illustrated in FIG. 2) to compute a validator of the ciphertext which can be verified safely prior to decryption. While this process is well suited to a broad range of applications, other techniques for creating a value that could serve a similar role, and may be adequate in certain settings. For example, in some embodiments the encryption process is not required to be resistant to external monitoring (but the decryption process does require such resistance) and/or algorithm-level countermeasures for public key digital signing processes (such as those described in U.S. Pat. No. 6,304,658) may be present. For these systems, digital signing (digital signature) operations may be used to construct a value which can be verified at decryption time to ensure that the ciphertext is unmodified. For example, the digital signature could authenticate the message identifier and at least one encrypted segment. Examples of public key digital signing algorithms include, without limitation, RSA, DSA, and elliptic curve DSA variants (including without limitation EC-DSA). The verification of a digital signature does not require any sensitive information, and accordingly may be performed prior to decryption. However, this flexibility comes at the cost of requiring public key signing logic within the encrypting device and public key verification logic within the decrypting device. It is also possible for a validator (or validator substitute) to be comprised of multiple symmetric validators, public key signatures, or other elements.

Non-Sequential Segment Key Derivation

Segment keys (e.g., $K_1, K_2, \ldots K_L$ in FIG. 3) and sub-segment keys ($K_{i,1}, K_{i,2}$, etc. in FIG. 13) are not required to be derived sequentially. For example, keys can be derived in a hierarchical tree pattern, or more generally each key can be a function of any prior key(s), or could be independently derived from $K_{ROOT}$ using the key tree construction, or keys could be derived using some combination of other keys and the key tree construction.

Reordering of Data Transmissions and Calculations

The ordering of data transmissions and operations can be altered. For example, the first exemplary embodiment described in FIGS. 1, 3 and 4 shows the encryption process proceeding from the last segment $D_L$ to the first segment $D_1$ with each segment $D_i$ containing the hash of the encryption result, $E_{i+1}$, of the i+1'th segment. A separate validator is computed for the first encrypted segment $E_1$ (e.g., see step 106). This approach can be advantageous for the decrypting device as shown in FIG. 4, since it does not need to buffer the entire encryption result before decrypting, whereas the encrypting device has to do so.

Alternatively, the encrypting device could encrypt the segments starting from $D_1$ and ending with $D_L$, with each segment $D_{i+1}$ containing the hash of the encryption $E_i$ of the previous segment. In this example, the segment $D_1$ is (for example) extended by a string of 0's of size equal to the output length of the hash function to indicate it is the first segment. A validator, created using the key-tree is then computed using PATH=$h(E_L)$. For this variant, the decryption process is similar to FIG. 4, but proceeds in the reverse direction starting from the last encrypted segment to the first. Thus, the encrypting device no longer has to buffer the data segments, although the decrypting device now has to do so.

Substitution of Additional Validators for Hashes

Although some examples show hashes in data segments which authenticate subsequent encrypted segments, the subsequent segments can alternatively carry their own independent validator. For example, FIG. 3 shows first data segment (312) carrying a hash $h(E_2)$ to validate that segment $B_2$ was not changed. However, such hash is not always required, and in some cases could be omitted (e.g., if the next segment instead carries a validator). This simplifies encryption somewhat, but increases computation time since more validators need to be computed and checked. In streaming applications or if storage/memory are limited, the additional computational effort may be justified given the benefit of avoiding the need to have the subsequent data available and buffered.

Variations in Hashing

In some diagrams, a single operation, such as h( ) in FIG. 3, is applied multiple times and/or is used for different uses. It is generally not required that these all be the same function. For example, different steps could employ different hash functions.

The output of hash function may be truncated, combined with other hash function outputs, or otherwise modified through post-processing. For example, SHA-2 produces a 256-bit output hash, but a shorter message identifier (such as 160-, 128-, 80- or 64-bits) may be desired. The function h( ) may use SHA-2 internally and return only some bits of its result.

Variations in Order of Operations

Some of the exemplary embodiments designate a specific order in which data elements are concatenated or combined. For instance, in FIG. 3, steps 303-312, the data $D_i$ is concatenated with the hash $h(E_{i+1})$. Other examples where data segments are concatenated in sequence before being hashed include FIG. 5, elements 501-504 & 513, in step 306 of FIG. 3. These specific orderings are just one example of a possible ordering, and a variety of other data orderings could be utilized in alternate embodiments.

Variations in Tree-Based Key Derivation

If operations (such as $f_i$) are invertible, it is possible to use a value other than the top of the tree as the starting value. Similarly, computed values can be cached (e.g., if the message identifier is a counter, the initial operations will usually not change from one message to the next and therefore do not need to be recomputed).

Error Detection and/or Correction

It is well known in the art that incorrect outputs produced as a result of injecting faults in a cryptographic device's operation can yield information about sensitive data and keys. When practical, cryptographic operations can be checked to help prevent the release of incorrect computations which can compromise secrets. For example, a simple and effective technique is to perform cryptographic operations twice, ideally using two (or more) independent hardware processors and implementations, with a comparator to verify that both (or all) produce identical results. If the results produced by the units do not match, the comparator will prevent either result from being used and/or trigger other error conditions. Within individual cryptographic operations (such as hashing steps), error-detection and/or error-correction logic can also be employed to help prevent or detect situations where cryptographic operations are performed incorrectly.

The techniques disclosed in this patent may additionally provide some inherent resistance against certain types of fault injection attacks on the encryption and decryption processes. During the encryption process, a limited or partial fault introduced during the key tree based key derivation process would produce random, unpredictable results due to the usage of entropy redistribution functions within this process. In particular, corrupted intermediates will typically be mixed by subsequent entropy redistribution functions, which will limit adversaries' ability to mount attacks utilizing defective results.

Likewise, during decryption, faults or errors introduced within the ciphertext or the message identifier processing will generally resulting the validator being rejected. The second embodiment, with plaintext hash chaining, provides further resistance since the plaintext segments are independently authenticated for correctness prior to being output. Of course, the checking of operations and other well known fault-detection techniques may additionally be utilized.

Self-diagnostic functions such as a POST (power-on-self-test) and random number testing may also be incorporated to verify that cryptographic functions and random number generation capability has not been damaged.

Additional Host Environments and Form Factors

Several exemplary systems and applications for the utilization of verifiable leak-resistant cryptography were described above. However, as those skilled in the art will appreciate, the techniques described above are not limited to particular host environments or form factors. Rather, they can be used in a wide variety of applications, including without limitation: application-specific integrated circuits (ASICs), field programmable gate arrays (FPGAs), systems on chip (SoC), microprocessors, secure processors, secure network devices, cryptographic smartcards of all kinds (including without limitation smartcards substantially compliant with ISO 7816-1, ISO 7816-2, and ISO 7816-3 ("ISO 7816-compliant smartcards")); contactless and proximity-based smartcards and cryptographic tokens (including without limitation smartcards substantially compliant with ISO 14443); stored value cards and systems; cryptographically secured credit and debit cards; customer loyalty cards and systems; cryptographically authenticated credit cards; cryptographic accelerators; gambling and wagering systems; secure cryptographic chips; tamper-resistant microprocessors; software programs (including without limitation to programs for use on personal computers, servers, etc. and programs that can be loaded onto or embedded within cryptographic devices); key management devices; banking key management systems; secure web servers; defense systems; electronic payment systems; micropayment systems and meters; prepaid telephone cards; cryptographic identification cards and other identity verification systems; systems for electronic funds transfer; automatic teller machines; point of sale terminals; certificate issuance systems; electronic badges; door entry systems; physical locks of all kinds using cryptographic keys; systems for decrypting television signals (including without limitation, broadcast television, satellite television, and cable television); systems for decrypting enciphered music and other audio content (including music distributed over computer networks); systems for protecting video signals of all kinds; content protection and copy protection systems (such as those used to prevent unauthorized copying or use of movies, audio content, computer programs, video games, images, text, databases, etc.); cellular telephone scrambling and authentication systems (including telephone authentication smartcards); secure telephones (including key storage devices for such telephones); cryptographic PCMCIA cards; portable cryptographic tokens; and cryptographic data auditing systems.

All of the foregoing illustrates exemplary embodiments and applications of the verifiable leak-resistant cryptography, from which related variations, enhancements and modifications will be apparent in the context of the spirit and scope of the disclosure. Therefore, the invention(s) protected by this patent should not be limited to the foregoing disclosure, but rather construed by the claims appended hereto.

What is claimed is:

1. A method for encrypting plaintext data by a device with an internal secret state, while limiting the re-use of cryptographic keys, comprising:
   (a) deriving a message key from said internal secret state and a message identifier by computing, using a hardware unit, a plurality of successive intermediate keys, starting with at least a portion of said internal secret state and leading to said message key, where each successive key is derived based on at least a portion of said message identifier and a prior key;
   (b) using said one or more cryptographic keys based on at least said message key to encrypt one or more segments of said plaintext data to produce one or more encrypted data segments;
   (c) computing a cryptographic hash from at least one said encrypted data segment;
   (d) deriving a validator from at least a secret value and said cryptographic hash, where said deriving includes computing a plurality of successive intermediate values, starting with said secret value, where each successive value is at least based on a prior one of said values and a portion of said cryptographic hash;
   (e) outputting said one or more encrypted data segments and said validator.

2. The method of claim 1 where said derivation of each said intermediate key in (a) includes selecting an entropy distribution operation, then applying said entropy distribution operation to said prior key.

3. The method of claim 2 where said message identifier is decomposed into a plurality of parts, each said part determining a particular entropy distribution operation to be applied.

4. The method of claim 2 where said entropy distribution operation is a cryptographic hash operation depending on at least: (i) said prior key; and (ii) a value corresponding to at least a portion of said message identifier.

5. The method of claim 1 where said cryptographic keys in (b) are derived from said message key using key chaining.

6. The method of claim 1 where said message key in (a) is computed by following a path through a key tree, said path comprising said message identifier.

7. The method of claim 6 where said validator is computed by following a path through a key tree, said path comprising a hash based on said encrypted data segments.

8. The method of claim 1 where (b) includes deriving a plurality of said cryptographic keys from said message key by performing a plurality of entropy distribution operations; and further: (i) one of said cryptographic keys is computed by applying an entropy distribution function to said message key; and (ii) each of a plurality of successive cryptographic keys is computed by applying an entropy distribution function to a prior one of said cryptographic keys.

9. The method of claim 1 where: (i) said plaintext data comprises a plurality of segments; (ii) each of said cryptographic keys is used in encrypting only one plaintext segment, producing an encrypted data segment; and (iii) a cryptographic hash based on all of said encrypted data segments is computed.

10. The method of claim 9 where said cryptographic hash in (iii) is computed using hash chaining.

11. The method of claim 10 where, in said hash chaining, said encrypted data segments are hashed in the reverse order from the order in which said encrypted data segments are outputted.

12. The method of claim 1 where in (b): (i) said plaintext data comprises a plurality of segments, and each segment comprises a plurality of sub-segments; and (ii) for each plaintext sub-segment, a new one of said cryptographic keys is used to encrypt said sub-segment.

13. The method of claim 12 further comprising using hash chaining to compute a cryptographic hash based on all of said encrypted data segments.

14. The method of claim 1 where in (b): (i) said plaintext data includes a plurality of segments; (ii) cryptographic key updates occur on an intra-segment basis; and (iii) each said encrypted data segment is produced by using at least one of said updated cryptographic keys.

15. The method of claim 1 where each said successive intermediate value is the result of a cryptographic hash operation whose inputs are determined only by: (1) the immediate parent value of said successive intermediate value; and (2) one or two bits of said encrypted data segment hash.

16. The method of claim 1 where there is only one plaintext data segment and only one encrypted data segment, and where said cryptographic hash computation further includes a data segment length.

17. The method of claim 1 where said message identifier is generated randomly.

18. The method of claim 1 where said message identifier is a counter.

19. The method of claim 1 where said device is a networked communications device transmitting data packets to a decrypting device.

20. The method of claim 1 further comprising authenticating a decrypting device prior to transmitting encrypted data thereto.

21. A method for encrypting plaintext data by a device with an internal secret state, while limiting the re-use of cryptographic keys, comprising:
   (a) deriving a message key from said internal secret state and a message identifier by computing, using a hardware unit, a plurality of successive intermediate keys, starting with at least a portion of said internal secret state and leading to said message key, where each successive key is derived based on at least a portion of said message identifier and a prior key;
   (b) using said one or more cryptographic keys based on at least said message key to encrypt one or more segments of said plaintext data to produce one or more encrypted data segments;
   (c) using a secret key to compute a cryptographic verification value at least based on, and usable to verify, one or more of said encrypted data segments; and
   (d) outputting said one or more encrypted data segments and said cryptographic verification value.

22. The method of claim 21 where said cryptographic verification value is a digital signature which authenticates at least one of said encrypted data segments.

23. A method for decrypting data by a device with an internal secret state, while limiting the re-use of cryptographic keys, comprising:
   (a) receiving one or more encrypted data segments and a cryptographic verification value, and obtaining a message identifier corresponding thereto;

(b) verifying said cryptographic verification value to determine whether said message identifier or at least one of said encrypted data segments have been modified, including:
  (i) computing, using a hardware unit, a cryptographic hash from at least one said encrypted data segment;
  (ii) deriving, using the hardware unit, an expected validator from at least a secret value and said cryptographic hash, where said deriving includes computing a plurality of successive intermediate values, starting with said secret value, where each successive value is at least based on a prior one of said values and a portion of said cryptographic hash; and
  (iii) comparing said derived expected candidate validator with said received cryptographic verification value;
(c) deriving a message key from said internal secret state and said message identifier by computing a plurality of successive intermediate keys, starting with at least a portion of said internal secret state and leading to said message key, where each successive key is derived based on at least a portion of said message identifier and a prior key; and
(d) using said one or more cryptographic keys based on at least said message key to decrypt one or more verified segments of said encrypted data to produce one or more plaintext data segments.

24. The method of claim 23 where said derivation of each said intermediate key in (c) includes selecting an entropy distribution operation, then applying said entropy distribution operation to said prior key.

25. The method of claim 24 where said message identifier is decomposed into a plurality of parts, each said part determining a particular entropy distribution operation to be applied.

26. The method of claim 25 where said entropy distribution operation is a cryptographic hash operation depending on at least: (i) said prior key; and (ii) a value corresponding to at least a portion of said message identifier.

27. The method of claim 23 where said cryptographic keys in (d) are derived from said message key using key chaining.

28. The method of claim 23 where said message key in (c) is computed by following a path through a key tree, said path comprising said message identifier, and where said validator is computed by following a path through a key tree, said path comprising a hash based on said encrypted data segments.

29. The method of claim 23 where (d) includes deriving a plurality of said cryptographic keys from said message key by performing a plurality of entropy distribution operations.

30. The method of claim 29 where: (i) one of said cryptographic keys is computed by applying an entropy distribution function to said message key; and (ii) each of a plurality of successive cryptographic keys is computed by applying an entropy distribution function to a prior one of said cryptographic keys.

31. The method of claim 23 where: (i) said encrypted data comprises a plurality of segments; (ii) each encrypted data segment, excluding the last, includes a representation of a cryptographic hash of the next encrypted data segment; (iii) prior to decrypting the first encrypted data segment, its cryptographic hash is computed and verified; (iv) prior to decrypting each subsequent segment, its cryptographic hash is computed and compared against the hash represented in the prior encrypted data segment; and (v) each of said cryptographic keys is used in decrypting only one encrypted data segment.

32. The method of claim 23 where in (d): (i) said encrypted data comprises a plurality of segments, and each segment comprises a plurality of sub-segments; and (ii) for each encrypted sub-segment, a new one of said cryptographic keys is used to decrypt said sub-segment.

33. The method of claim 23 where said hash depends on all of said encrypted data segments.

34. The method of claim 23 where in (b): (i) said encrypted data includes a plurality of segments; (ii) cryptographic key updates occur on an intra-segment basis; and (iii) each said plaintext data segment is produced by using at least one of said updated cryptographic keys.

35. The method of claim 23 where each said successive intermediate value is the result of a cryptographic hash operation whose inputs include: (A) a parent value; and (B) its value corresponding to at least a portion of said encrypted data segment hash.

36. The method of claim 35 where said inputs to said cryptographic hash operation are determined only by: (1) the immediate parent value of said successive intermediate value; and (2) one or two bits of said encrypted data segment hash.

37. The method of claim 23 where there is only one plaintext data segment and only one encrypted data segment, and where said cryptographic hash computation further includes a data segment length.

38. The method of claim 23 where said expected validator validates a hash, where: (i) said hash depends on a first encrypted data segment that incorporates the hash of a second encrypted data segment; and (ii) said second and subsequent encrypted data segments each incorporate the hash of the next encrypted data segment.

39. The method of claim 23 where said message identifier is a counter.

40. The method of claim 23 where said message identifier is a cryptographic hash of at least part of said plaintext data.

41. The method of claim 23 where said plaintext data includes an FPGA bitstream.

42. The method of claim 23 comprising the additional step of using a processor to execute at least a portion of said plaintext data.

43. The method of claim 23 used to secure data being loaded, by a chip containing a processor, from an external memory into an on-chip cache.

44. The method of claim 23 where said device is a networked communications device receiving data packets from a decrypting device.

45. The method of claim 23 further comprising anti-rollback protection.

46. A method for decrypting data by a device with an internal secret state, while limiting the re-use of cryptographic keys, comprising:
  (a) receiving one or more encrypted data segments and a cryptographic verification value, and obtaining a message identifier corresponding thereto;
  (b) verifying said cryptographic verification value to determine whether said message identifier or at least one of said encrypted data segments have been modified;
  (c) deriving a message key from said internal secret state and said message identifier by computing, using a hardware unit, a plurality of successive intermediate keys, starting with at least a portion of said internal secret state and leading to said message key, where each successive key is derived based on at least a portion of said message identifier and a prior key; and
  (d) using said one or more cryptographic keys based on at least said message key to decrypt one or more verified segments of said encrypted data to produce one or more plaintext data segments.

47. The method of claim 46 where said cryptographic verification value is a digital signature which authenticates at least one of said encrypted data segments.

48. A device for encrypting plaintext data while limiting the re-use of cryptographic keys, comprising:
a hardware unit configured to
(a) derive a message key from an internal secret state and a message identifier by computing a plurality of successive intermediate keys, starting with at least a portion of said internal secret state and leading to said message key, each successive key to be derived based on at least a portion of said message identifier and a prior key;
(b) use said one or more cryptographic keys based on at least said message key to encrypt one or more segments of said plaintext data to produce one or more encrypted data segments;
(c) compute a cryptographic hash from at least one said encrypted data segment;
(d) derive a validator from at least a secret value and said cryptographic hash, where said deriving includes computing a plurality of successive intermediate values, starting with said secret value, each successive value to be at least based on a prior one of said values and a portion of said cryptographic hash; and
(e) output said one or more encrypted data segments and said validator.

49. The device of claim 48 where said derivation of each said intermediate key in (a) is configured to include selection of an entropy distribution operation, then application of said entropy distribution operation to said prior key.

50. The device of claim 49 configured for said entropy distribution operation to be a cryptographic hash operation depending on at least: (i) said prior key; and (ii) a value corresponding to at least a portion of said message identifier.

51. The device of claim 48 configured for said message key in (a) to be computed by following a path through a key tree, said path comprising said message identifier.

52. The device of claim 48 configured for (b) to include deriving a plurality of said cryptographic keys from said message key by performing a plurality of entropy distribution operations; and configured for: (i) one of said cryptographic keys to be computed by applying an entropy distribution function to said message key; and (ii) each of a plurality of successive cryptographic keys to be computed by applying an entropy distribution function to a prior one of said cryptographic keys.

53. The device of claim 48 configured for each said successive intermediate value to be the result of a cryptographic hash operation whose inputs are determined only by: (1) the immediate parent value of said successive intermediate value; and (2) one or two bits of said encrypted data segment hash.

54. A device for encrypting plaintext data while limiting the re-use of cryptographic keys, comprising:
a hardware unit configured to
(a) derive a message key from said internal secret state and a message identifier by computing a plurality of successive intermediate keys, starting with at least a portion of said internal secret state and leading to said message key, each successive key to be derived based on at least a portion of said message identifier and a prior key;
(b) use said one or more cryptographic keys based on at least said message key to encrypt one or more segments of said plaintext data to produce one or more encrypted data segments;
(c) use a secret key to compute a cryptographic verification value at least based on, and usable to verify, one or more of said encrypted data segments; and
(d) output said one or more encrypted data segments and said cryptographic verification value.

55. The device of claim 54 configured for said cryptographic verification value to be a digital signature authenticating at least one of said encrypted data segments.

56. A device for decrypting data, while limiting the re-use of cryptographic keys, comprising:
a hardware unit configured to
(a) receive one or more encrypted data segments and a cryptographic verification value, and obtaining a message identifier corresponding thereto;
(b) verify said cryptographic verification value to determine whether said message identifier or at least one of said encrypted data segments have been modified, including;
(i) computing a cryptographic hash from at least one said encrypted data segment;
(ii) deriving an expected validator from at least a secret value and said cryptographic hash, where said derivation includes computing a plurality of successive intermediate values, starting with said secret value, where each successive value is at least based on a prior one of said values and a portion of said cryptographic hash; and
(iii) comparing said derived expected candidate validator with said received cryptographic verification value;
(c) derive a message key from said internal secret state and said message identifier by computing a plurality of successive intermediate keys, starting with at least a portion of said internal secret state and leading to said message key, where each successive key is derived based on at least a portion of said message identifier and a prior key; and
(d) use said one or more cryptographic keys based on at least said message key to decrypt one or more verified segments of said encrypted data to produce one or more plaintext data segments.

57. The device of claim 56 where said derivation of each said intermediate key in (c) is configured to include selection of an entropy distribution operation, then application of said entropy distribution operation to said prior key.

58. The device of claim 57 configured for said entropy distribution operation to be a cryptographic hash operation depending on at least: (i) said prior key; and (ii) a value corresponding to at least a portion of said message identifier.

59. The device of claim 56 configured for said message key in (c) to be computed by following a path through a key tree, said path comprising said message identifier.

60. The device of claim 56 configured for (d) to include deriving a plurality of said cryptographic keys from said message key by performing a plurality of entropy distribution operations; and configured for: (i) one of said cryptographic keys to be computed by applying an entropy distribution function to said message key; and (ii) each of a plurality of successive cryptographic keys to be computed by applying an entropy distribution function to a prior one of said cryptographic keys.

61. The device of claim 56 configured for each said successive intermediate value to be the result of a cryptographic hash operation whose inputs are determined only by: (1) the immediate parent value of said successive intermediate value; and (2) one or two bits of said encrypted data segment hash.

62. The device of claim 56 configured for there to be only one plaintext data segment and only one encrypted data segment, and for said cryptographic hash computation to further include a data segment length.

63. The device of claim 56 configured for said expected validator to validate a hash, where: (i) said hash is to depend on a first encrypted data segment that incorporates the hash of a second encrypted data segment; and (ii) said second and subsequent encrypted data segments is each configured to incorporate the hash of the next encrypted data segment.

64. The device of claim 56 where said device is an FPGA, and where said device is configured for said plaintext data to include an FPGA bitstream.

65. The device of claim 56 further configured to use a processor contained in said device to execute at least a portion of said plaintext data.

66. The device of claim 56 where said device is a chip containing a processor, and where said device is configured to secure data to be loaded, by said chip, from an external memory into an on-chip cache, and where said data to be loaded as previously encrypted by said chip.

67. A device for encrypting plaintext data while limiting the re-use of cryptographic keys, comprising:
a hardware unit configured to
(a) derive a message key from said internal secret state and a message identifier by computing a plurality of successive intermediate keys, starting with at least a portion of said internal secret state and leading to said message key, each successive key to be derived based on at least a portion of said message identifier and a prior key;
(b) use said one or more cryptographic keys based on at least said message key to encrypt one or more segments of said plaintext data to produce one or more encrypted data segments;
(c) use a secret key to compute a cryptographic verification value at least based on, and usable to verify, one or more of said encrypted data segments; and
(d) output said one or more encrypted data segments and said cryptographic verification value.

68. The device of claim 67 configured for said cryptographic verification value to be a digital signature which authenticates at least one of said encrypted data segments.

* * * * *